(12) United States Patent
Islam et al.

(10) Patent No.: US 6,721,473 B1
(45) Date of Patent: Apr. 13, 2004

(54) VARIABLE BLAZED GRATING BASED SIGNAL PROCESSING

(75) Inventors: Mohammed N. Islam, Allen, TX (US); Amos Kuditcher, Allen, TX (US)

(73) Assignee: Cheetah Omni, LLC, Ann Arbor, MI (US)

( * ) Notice: Subject to any disclaimer, the term of this patent is extended or adjusted under 35 U.S.C. 154(b) by 217 days.

(21) Appl. No.: 09/776,052

(22) Filed: Feb. 2, 2001

(51) Int. Cl.⁷ .................................................. G02B 6/35
(52) U.S. Cl. ............................. 385/18; 385/19; 385/47
(58) Field of Search ............................. 385/16, 18–19, 385/39, 47

(56) References Cited

U.S. PATENT DOCUMENTS

| | | | |
|---|---|---|---|
| 4,011,009 A | 3/1977 | Lama et al. | 350/162 R |
| 4,736,132 A | 4/1988 | Culp | 310/333 |
| 4,856,863 A | 8/1989 | Sampsell et al. | 350/96.16 |
| 4,900,119 A | 2/1990 | Hill et al. | 350/96.15 |
| 5,078,479 A | 1/1992 | Vuilleumier | 359/290 |
| 5,212,743 A | 5/1993 | Heismann | 385/11 |
| 5,311,360 A | 5/1994 | Bloom et al. | 359/572 |
| 5,459,610 A | 10/1995 | Bloom et al. | 359/572 |
| 5,500,761 A | 3/1996 | Goossen et al. | 359/290 |
| 5,654,819 A | 8/1997 | Goossen et al. | 359/291 |
| 5,659,418 A | 8/1997 | Yurke | 359/290 |
| 5,661,592 A | 8/1997 | Bornstein et al. | 359/291 |
| 5,701,193 A | 12/1997 | Vogel et al. | 359/290 |
| 5,745,271 A | 4/1998 | Ford et al. | 359/130 |
| 5,751,469 A | 5/1998 | Arney et al. | 359/291 |
| 5,825,528 A | 10/1998 | Goossen | 359/291 |

(List continued on next page.)

FOREIGN PATENT DOCUMENTS

| | | |
|---|---|---|
| GB | 2 071 896 A | 9/1981 |

OTHER PUBLICATIONS

Sene et al., "Polysilicon micromechanical gratings for optical modulation," Sensors and Actuators, A 57, pp. 145–151, 1996.

Burns et al., "Micro–Electro–Mechanical Variable Blaze Gratings," MEMS '97, IEEE 10th Annual International Workshop on Micro Electro Mechanical Systems, pp. 55–60, 1997.

Burns et al., "Development of microelectromechanical variable blaze gratings," Sensors and Actuators, A 64, pp. 7–15, 1998.

Pending patent application, USSN 09/776,051, (068069.0111), entitled "Variable Blazed Gratings," by Islam et al., pp. 1–69, Filed Feb. 2, 2001.

K.E. Petersen, "Micromechanical Light Modulator Array Fabricated On Silicon," Applied Physics Letters, vol. 31, No. 8, pp. 521–523, Oct. 15, 1977.

C. Marxer, et al., "Megahertz Opto–Mechanical Modulator," Elsevier Science S.A., pp. 46–50, 1996.

C. M. Ragdale, et al., "Integrated Three Channel Laser and Optical Multiplexer for Narrowband Wavelength Division Multiplexing," Electronics Letters, vol. 30, No. 11, pp. 897–898, May 26, 1994.

(List continued on next page.)

*Primary Examiner*—Akm Enayet Ullah
*Assistant Examiner*—Jerry T Rahll
(74) *Attorney, Agent, or Firm*—Baker Botts, L.L.P.

(57) ABSTRACT

In one aspect of the invention, an optical switching element includes a variable blazed grating operable to receive and reflect one or more input signals while the grating remains in a first position and to receive and diffract one or more input signals while the grating remains in a second position. The switching element further includes a first circulator operable to receive from the variable blazed grating a first output signal traveling approximately along the path of an input signal to the grating but in an approximately opposite direction to that input signal, and to redirect the first output signal from the path of the input signal.

65 Claims, 12 Drawing Sheets

U.S. PATENT DOCUMENTS

| | | | |
|---|---|---|---|
| 5,835,255 A | 11/1998 | Miles | 359/291 |
| 5,841,579 A | 11/1998 | Bloom et al. | 359/572 |
| 5,847,859 A | 12/1998 | Murata | 359/201 |
| 5,850,492 A | 12/1998 | Morasca et al. | 385/11 |
| 5,870,221 A | 2/1999 | Goossen | 359/290 |
| 5,914,804 A | 6/1999 | Goossen | 359/291 |
| 5,943,155 A | 8/1999 | Goossen | 359/247 |
| 5,943,158 A | 8/1999 | Ford et al. | 359/295 |
| 5,943,454 A | 8/1999 | Aksyuk et al. | 385/22 |
| 5,949,571 A | 9/1999 | Goossen et al. | 359/291 |
| 5,974,207 A | 10/1999 | Aksyuk et al. | 385/24 |
| 5,986,796 A | 11/1999 | Miles | 359/260 |
| 6,002,513 A | 12/1999 | Goossen et al. | 359/291 |
| 6,061,166 A | 5/2000 | Furlani et al. | 359/254 |
| 6,172,796 B1 | 1/2001 | Kowarz et al. | 359/290 |
| 6,268,952 B1 | 7/2001 | Godil et al. | 359/291 |

OTHER PUBLICATIONS

K.O. Hill, et al., "Narrow–Bandwidth Optical Waveguide Transmission Filters," Electronic Letters, vol. 23, No. 9, pp. 465–466, Apr. 23, 1987.

C. M. Ragdale, et al., "Integrated Laser and Add–Drop Optical Multiplexer for Narrowband Wavelength Division Multiplexing," Electronic Letters, vol. 28, No. 89, pp. 712–714, Apr. 9, 1992.

K. Aratani, et al., "Process and Design Considerations for Surface Micromachined Beams for A Tuneable Interferometer Array in Silicon," Handbook of Physics, pp. 230–235, 1993.

O. Solgaard, et al., "Deformable Grating Optical Modulator," Optics Letters, vol. 17, No. 9, pp. 688–690, May 1, 1992.

W. R. Wiszniewski, et al., Mechanical Light Modulator Fabricated On A Silicon Chip Using Simox Technology, pp. 1027–1030.

M.W. Chbat, "High–spectral–efficiency transmission systems," OFC 2000, Baltimore, MD, pp. TuJ1–1, 134–136, 2000.

J.W. Bayless, et al., "The Specification and Design of Bandlimited Digital Radio Systems," IEEE Transactions on Communications, vol. COM–27 (12): pp. 1763–1770, (1979).

D.E. Sene, et al., "Polysilicon Micromechanical Gratings for Optical Modulation," Elsevier Vol. Sensors and Actiators (A 57), pp. 145–151, 1996.

D. M. Burns, et al., "Micro–Electro–Mechanical Variable Blaze Gratings," IEEE 10th Annual International Workshop on Micro Mechanical Systems, pp. 385–391, 1997.

L. Y. Lin, et al., "Micromachined polarization–state controller and its application to polarization–mode dispersion compensation," OFC 2000, Baltimore, MD, pp. ThQ3–1, 244–246, 2000.

J.W. Bayless, et al., "High Density Digital Data Transmission," National Telecommunications Conference, Dallas, TX, pp. 1–6, 1976.

R.W. Corrigan, et al., "17.3: Calibration of a Scanned Linear Grating Light Value™ Projection System," www.siliconlight.com, 1999.

SLM "GLV Technology," www.siliconlight.com, 1999.

R.W. Corrigan, et al., "Grating Light Wave Technology for Projection Displays," Presented at the International Display Workshop, Kobe, Japan, 1998.

M. Ming, et al., "Principles and Applications of Optical Communications," Irwin, pp. 468 & 470, 1996.

SLM "The Grating Light Valve Technology," www.siliconlight.com, 1999.

SLM "The Scanned Gratings Light Valve Display Architecture," www.siliconlight.com, 1999.

A. Willner, "WDM Systems 1," OFC '97, Dallas, TX, pp. TuJ, 43–45, 1997.

C. Pu, et al., "Micromachined Integrated Optical Polarization–State Rotator," IEEE Photonics Technology Letters, vol. 12 (10), pp. 1358–1360, Oct. 2000.

D. T. Amm, et al., "5.2: Grating Light Valve™ Technology: Update and Novel Applications," Presented at Society for Information Display Symposium, Anaheim, CA, pp. 1–4, May 1998.

D. M. Bloom, "The Grating Light Valve: revolutionizing display technology," www.siliconlight.com, 1998.

D. T. Amm, et al., "Optical Performance of the Grating Light Valve Technology," Presented at Photonics West–Electronic Imaging, Sunnyvale, CA, pp. 1–8, 1999.

J. E. Ford, et al., "Fiber–Coupled Variable Attenuator Using a Mars Modulator," SPIE, vol. 3226, pp. 86–96, 1997.

D. M. Burns, et al., "Development of Microelectromechanical Variable Blaze Gratings," Elsevier Science S.A. (A 64), pp. 7–15, 1998.

C. K. Madsen, et al., "A Tunable Dispersion Compensating MEMS All–Pass Filter," IEEE Photonics Technology Letters, vol. 12 (6), pp. 651–653, 2000.

J. E. Ford, et al., "Passband–Free Dynamic WDM Equalization," ECOC '98, Madrid, Spain, pp. 317–318, 1998.

K. W. Goossen, et al., Micromechanical Gain Slope Compensator for Spectrally Linear Optical Power Equalization, 2000.

K. W. Goossen, et al., "Silicon Modulator Based on Mechanically–Active Anti–Reflective Layer with 1 Mbit/sec Capability for Fiber–in–the–Loop Applications," IEEE Photonics Technology Letters, vol. 6 (9), pp. 1119–1121, 1994.

L. Y. Lin, et al., "Angular–Precision Enhancement in Free–Space Micromachined Optical Switches", IEEE Photonics Technology Letters, vol. 11 (10), pp. 1253–1255, 1999.

L. Y. Lin, et al., "Free–Space Micromachined Optical Switches with Submillisecond Switching Time for Large–Scale Optical Crossconnects," IEEE Photonics Technology Letters, vol. 10 (4), pp. 525–527, 1998.

L. Y. Lin, et al., "Optical Crossconnects for High–capacity Lightwave Networks," Journal of High Speed Networks, pp. 17–34, 1999.

E. P. Furtani, et al., "Analysis of grating light valves with partial surface electrodes," American Institute of Physics, vol. 83 (2), pp. 629–634, 1998.

E. P. Furlani, et al., "Theory and simulation of viscous damped reflection phase gratings," J. Phys. D: Appl. Phys., vol. 32, pp. 412–416, 1999.

K. Aratani, et al., "Surface micromachined tuneable interferometer array," Sensors and Actuators, vol. 43, pp. 17–23, 1994.

R. T. Howe, et al., "Polycrystalline Silicon Micromechanical Beams", Journal Electrochemical Society, vol. 130 (6), pp. 1420–1423, 1983.

S. R. Mallinson, "Wavelength–selective filters for single–mode fiber WDM systems using Fabry–Perot interferometers," Applied Optics, vol. 26 (3), pp. 430–436, 1987.

L. Y. Lin, et al., "Micromachined Polarization–state–controller and its Application to Polarization–mode Dispersion–compensation," OFC 2000, Baltimore, MD, pp. ThQ3–1, 144–246, 2000.

L.Y. Lin, et al., "Optical–layer Networking: Opportunities for and Progress in Lightwave Micromachines," OFC 2000 Baltimore, MD, pp. 1–88, 2000.

Author Unknown, "Diffraction and Interference," Optics, Chapter 6, pp. 102–103.

"Polarization Mode Dispersion (PMD)," Cables & Components Technical Papers, http://www.usa.alcatel.com/cc/tech-prs/fnlpmd2.htm, 2000.

"Menyuk Tutorial," OFC 2000, pp. 92–94, Mar. 2000.

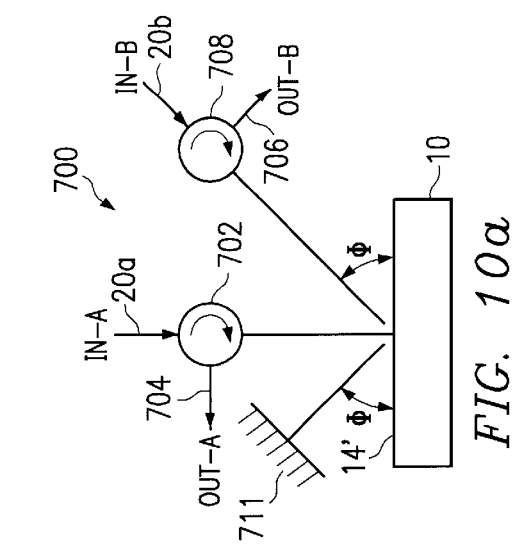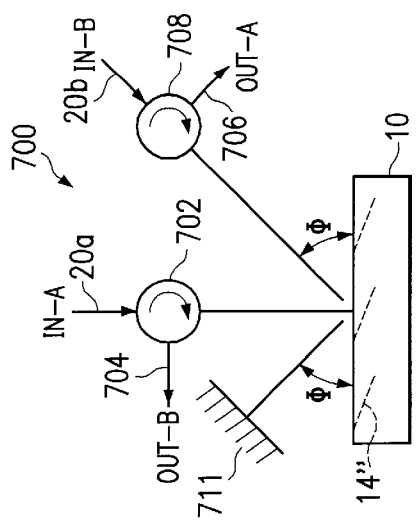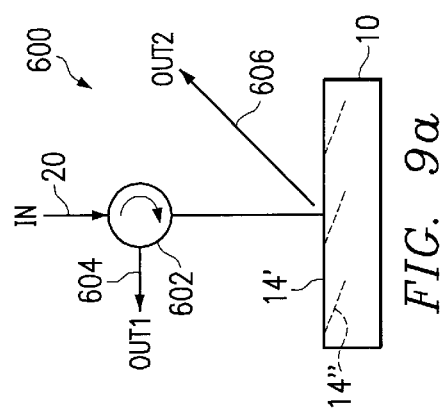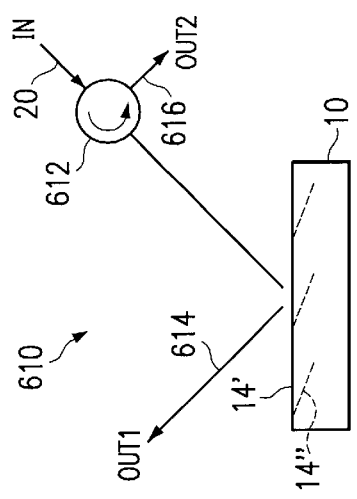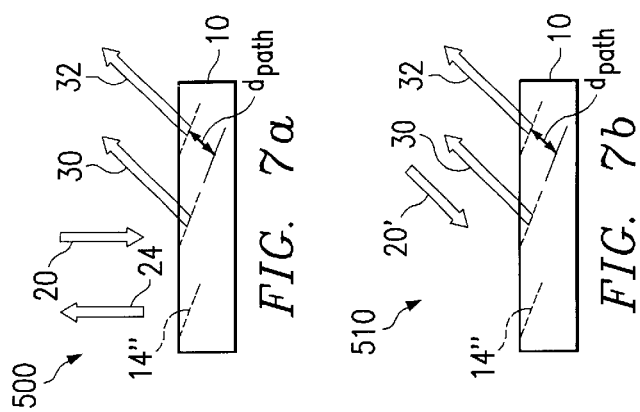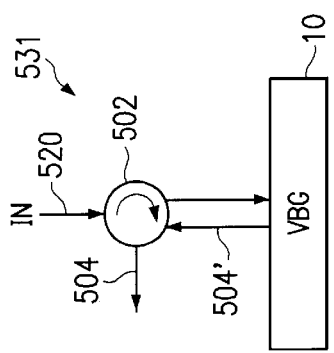

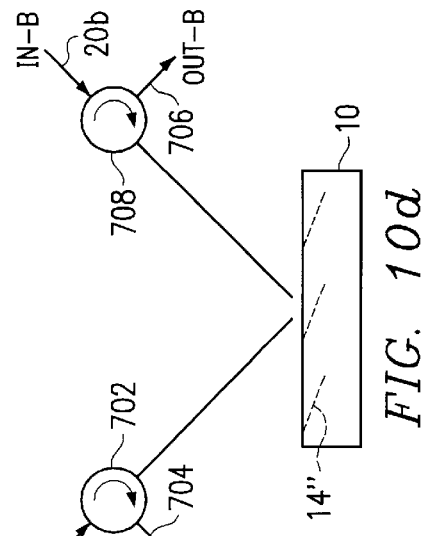
FIG. 10d
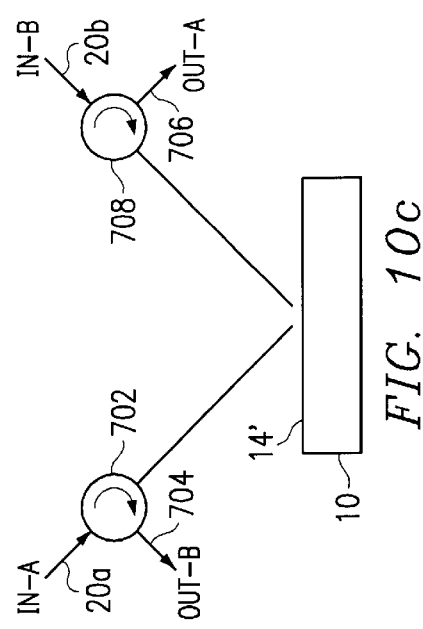
FIG. 10c
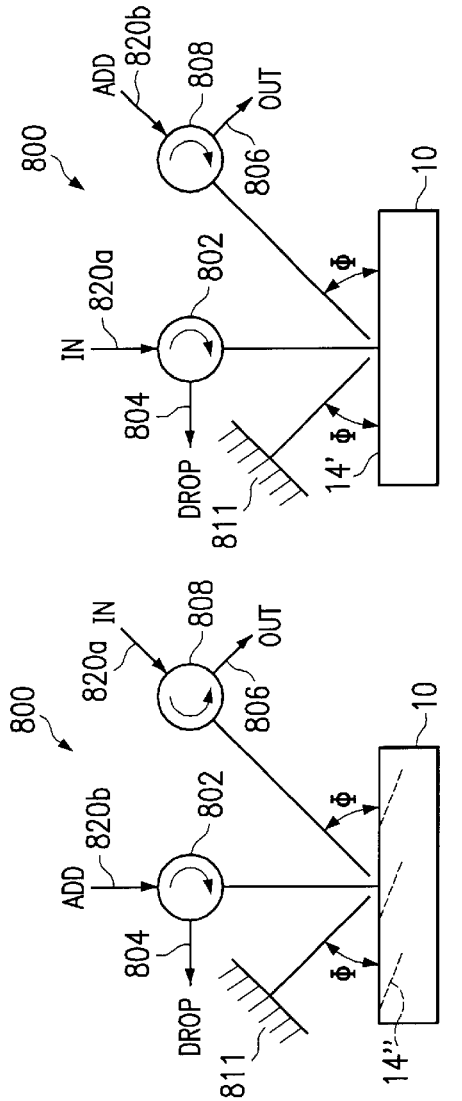
FIG. 11c
FIG. 11b
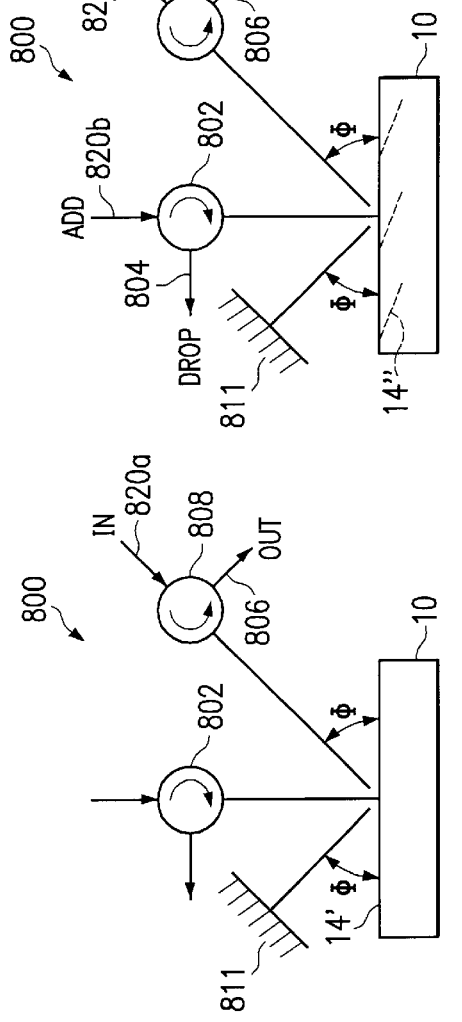
FIG. 11a

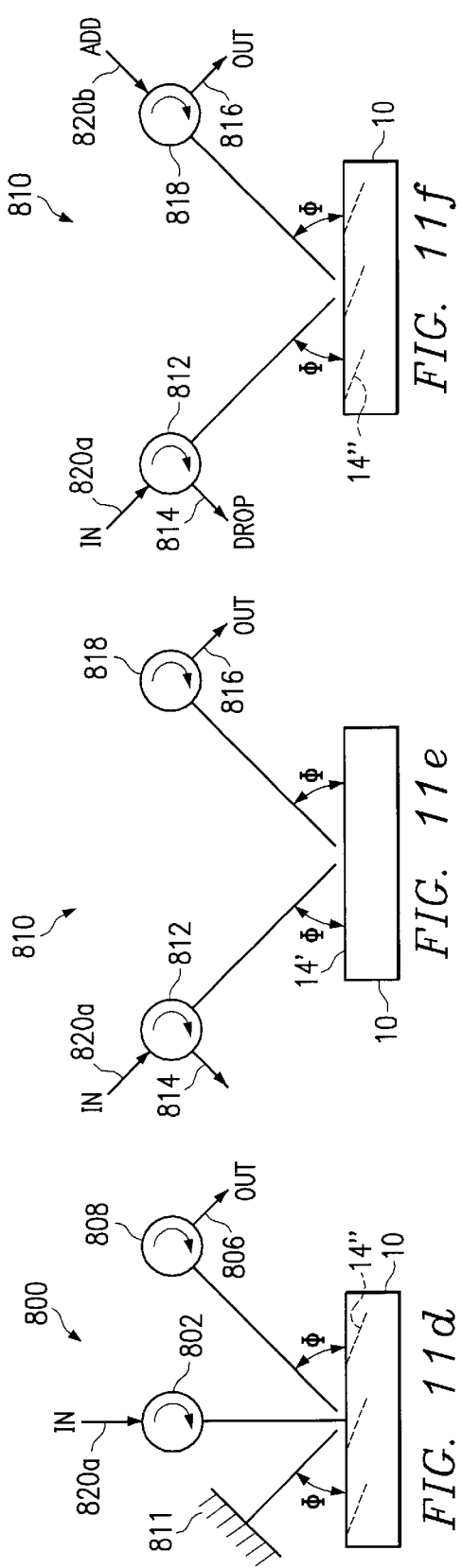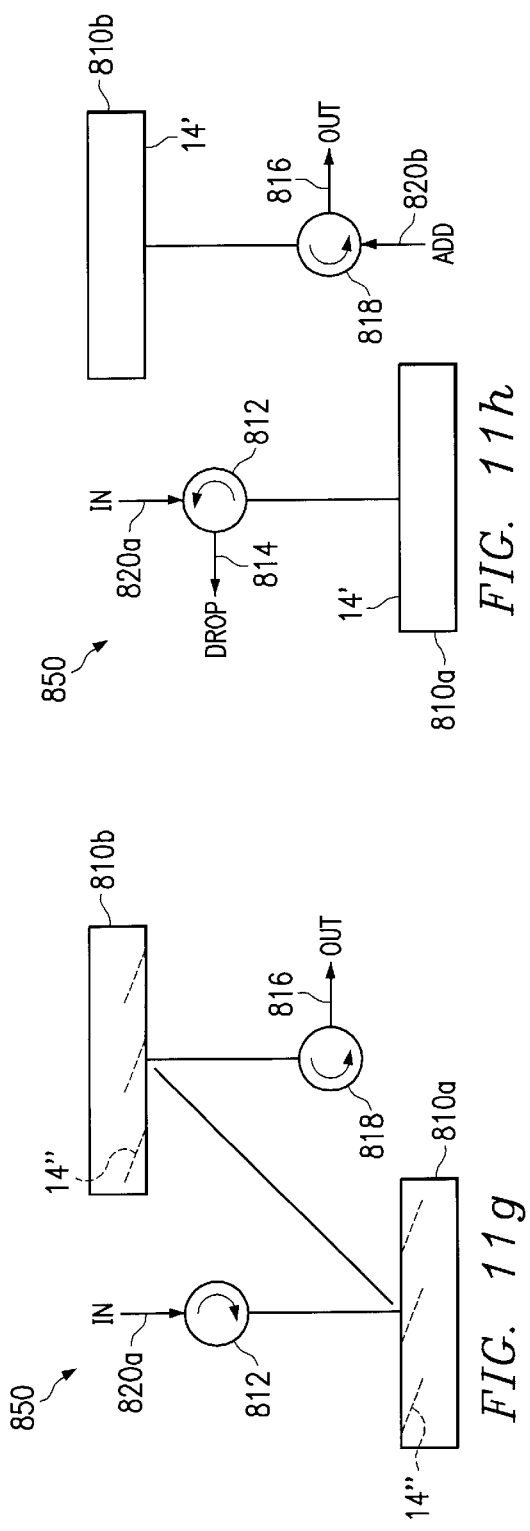

VARIABLE BLAZED GRATING BASED SIGNAL PROCESSING

RELATED APPLICATION

This application is related to U.S. Pat. No. 6,445,502, entitled *"Variable Blazed Grating,"* filed on Feb. 2, 2001. These applications have been commonly assigned to *Cheetah Omni, LLC*.

TECHNICAL FIELD OF THE INVENTION

The present invention relates to the field of communication systems, and more particularly to an apparatus and method operable to facilitate signal processing using variable blazed grating based elements.

BACKGROUND OF THE INVENTION

As optical systems continue to increase the volume and speed of information communicated, the need for methods and apparatus operable to facilitate high speed optical signal processing also escalates. Various devices and methodologies have been developed to provide numerous signal processing capabilities on optical signals. Some of these devices attempt to control a diffraction of an input optical signal to facilitate basic signal processing functions.

One such approach, known as a variable blazed grating, implements a movable diffraction grating that can be selectively displaced to cause a majority of the diffracted input signal to travel in a particular direction. Co-pending application Ser. No. 09/776,051, entitled "Variable Blazed Grating", filed Feb. 2, 2001 provides a number of examples of such devices.

In some aspects of operation, variable blazed gratings operate to reflect or diffract signals along the same signal path as that of an optical signal being input to the grating. If left unchecked, the input and output signals traveling on the same path can interfere with one another, or the output signal could cause complications to the source of the input signal.

SUMMARY OF THE INVENTION

The present invention recognizes a need for a method and apparatus operable to economically facilitate high speed optical signal processing. In accordance with the present invention, apparatus and methods operable to facilitate optical signal processing are provided that substantially reduce or eliminate at least some of the shortcomings associated with prior approaches.

In one aspect of the invention, an optical switching element comprises a variable blazed grating operable to receive and reflect one or more input signals while the grating remains in a first position and to receive and diffract one or more input signals while the grating remains in a second position. The switching element further comprises a first circulator operable to receive from the variable blazed grating a first output signal traveling approximately along the path of an input signal to the grating but in an approximately opposite direction to that input signal, and to redirect the first output signal from the path of the input signal.

In still another aspect of the invention, a method of processing optical signals using a variable blazed grating comprises receiving at a variable blazed grating residing in a first position one or more optical input signals and displacing the grating between a first position and a second position. The method further comprises reflecting the input signals while the blazed grating remains at the first position and, for each input signal received, diffracting a majority of that input signal in a particular direction while the grating remains at the second position. The method still further includes receiving from the grating a first output signal at a first circulator disposed in the path of an input signal, the first circulator operable to redirect the first output signal from the path of the input signal.

In yet another aspect of the invention, an optical switching element comprises a variable blazed grating operable to receive a first optical input signal from a first input and to reflect the first signal toward a first output while the grating remains in a first position, the variable blazed grating further operable to undergo a displacement to a second position, the displacement resulting in a diffraction of a majority of the first input signal toward a second output. The optical switching element is operable to switch between the first position and the second position and at a rate optimized for a specified packet size.

In another aspect of the invention, a system operable to process multiple wavelengths of light using variable blazed gratings comprises a wavelength division demultiplexer operable to receive an optical signal comprising a plurality of wavelength signals and to separate at least some of the plurality of wavelength signals from others of the wavelength signals, and an array of variable blazed grating devices. Each variable blazed grating device is operable to process at least one of the wavelength signals by reflecting the received signal in one direction while a grating of the variable blazed grating device resides in a first position and diffracting a majority of the received signal in a second direction while the grating resides in a second position.

In still another aspect of the invention, a method of processing a plurality of wavelength signals comprises separating an optical input signal comprising a plurality of wavelength signals into a plurality of input wavelength signals, each carrying one or more wavelengths of light, and communicating at least some of the input wavelength signals to an array of variable blazed gratings for processing. Each variable blazed grating device having a grating operable to be displaced between at least a first position and a second position. For each input wavelength signal received by the array, the method includes positioning the grating in either the first or the second position, reflecting in a first direction each received input wavelength signal from the receiving grating while the receiving grating resides at the first position, and diffracting a majority of each received input wavelength signal in a second direction while the receiving grating resides at the second position.

In yet another aspect of the invention, a variable blazed grating based optical add/drop multiplexer comprises a variable blazed grating oriented in a first position and operable to receive a first optical signal and a second optical signal, while the grating remains in a first position the blazed grating operable to reflect the first signal toward a first circulator and to reflect the second signal toward a second circulator. Either the first or the second circulator is coupled to an output port and the other is coupled to a drop port. The variable blazed grating is operable to undergo a selective displacement to a second position, the displacement resulting in a diffraction of a majority of the first input signal toward the second circulator and a diffraction of a majority of the second input signal toward the first circulator.

In another aspect of the invention, a method of facilitating optical add/drop multiplexing using a blazed grating comprises receiving a first optical signal and a second optical signal at a variable blazed grating residing in a first position. The method further comprises reflecting the first signal toward a first circulator and the second signal toward a second circulator while the mirror strips remain at the first position, wherein either the first or the second circulator is coupled to an output port and wherein the other is coupled to a drop port. The method still further comprises displacing the grating from the first position to a second position, and while the grating resides at the second position, diffracting a majority of the first signal in one direction toward the second circulator and diffracting a majority of the second signal in another direction toward the first circulator.

In still another aspect of the invention, a blazed grating based wavelength division add/drop multiplexer comprises a wavelength division demultiplexer operable to receive an optical input signal comprising a plurality of wavelength signals and to separate the plurality of wavelength signals from one another and an array of blazed grating based add/drop multiplexers each operable to receive at least one of the wavelength signals. Each add/drop multiplexer comprises a variable blazed grating oriented in a first position and operable to receive at least one of the wavelength signals and an added signal, while the grating remains in a first position the blazed grating operable to reflect the received wavelength signal toward a first circulator and to reflect the added signal toward a second circulator, wherein either the first or the second circulator is coupled to an output port and the other is coupled to a drop port. The variable blazed grating is operable to undergo a selective displacement to a second position, the displacement resulting in a diffraction of a majority of the received wavelength signal toward the second circulator and a diffraction of a majority of the added wavelength signal toward the first circulator.

In yet another aspect of the invention, a blazed grating based electro-optic switching system comprises a fiber optic tap operable to receive an optical signal having header information and payload information and to form a first signal copy comprising at least the header information and a second signal copy comprising at least the payload information. The system further comprises an electronic processor operable to receive the first signal copy and to perform electronic processing on the header information, and an array of blazed grating based optical switch elements operable to receive the first and second signal copies and to perform an optical switching operation on the first and second signal copies.

Depending on the specific features implemented, particular aspects and embodiments of the present invention may exhibit some, none, or all of the following technical advantages. One aspect of the present invention provides an efficient and cost effective mechanism for facilitating high speed signal processing using a diffraction based technology while reducing or eliminating at least some of shortcomings typically associated with diffraction based signal processing. For example, particular embodiments of the invention facilitate diffraction based signal processing that maintains good contrast ratios without requiring the additional beam collection and/or combining technology often associated with other approaches.

One aspect of the invention utilizes optical circulators in combination with variable blazed gratings to redirect output signals from the path of incoming signals. This facilitates enhanced system performance by reducing or eliminating interference between input and output signals, while avoiding at least some of the losses typically associated with other approaches.

One aspect of the invention facilitates multiple wavelength signal processing in a multiple-wavelength system by combining wavelength demultiplexers with variable blazed grating switching elements. This technique applies to a number of signal processing applications, such as optical gain equalization, add/drop multiplexing, and optical switching systems.

The invention facilitates fabrication of arrays of blazed-grating based elements at a nominal incremental cost over that of producing a single element. This aspect of the invention facilitates construction of, for example, gain equalizers and wave-division add/drop multiplexers capable of processing numerous wavelengths for a small incremental cost over a single stage of elements. This provides significant cost savings in processing signals carrying information on multiple channels or wavelengths.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIGS. 7a and 7b illustrate blazed grating based variable optical attenuators constructed according to the teachings of the present invention;

FIG. 8 is a block diagram showing a novel combination of a variable blazed grating and an optical circulator constructed according to the teachings of the present invention;

FIGS. 9a–9b are block diagrams illustrating examples of blazed grating based 1×2 optical switches constructed according to the teachings of the present invention;

FIGS. 10a–10d are block diagrams illustrating various modes of operation of a blazed grating based 2×2 optical switch constructed according to the teachings of the present invention;

FIGS. 11a–11h are block diagrams illustrating examples of various embodiments of blazed grating based optical add/drop multiplexers constructed according to the teachings of the present invention;

DETAILED DESCRIPTION OF THE INVENTION

Generally, a variable blazed grating device is an element having a diffraction grating that can be selectively displaced relative to an incoming optical signal, with the result that the majority of the diffracted portions of the optical signal are communicated in one direction. One aspect of the present invention relates to a novel configuration of a variable blazed grating device.

Figure 1A:
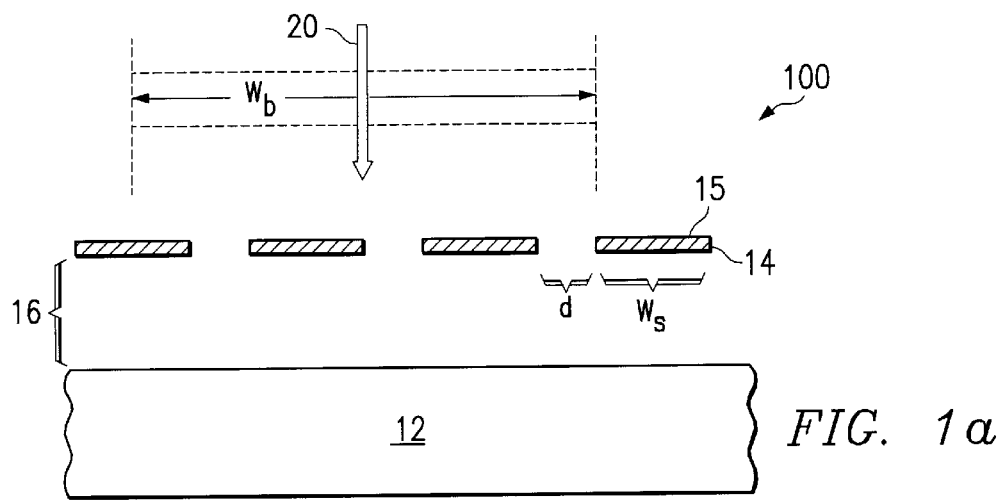
FIGS. 1a–1c are block diagrams illustrating greatly enlarged cross-section views of various exemplary embodiments of blazed grating-based apparatus operable to facilitate high speed optical signal processing according to the teachings of the present invention.

FIG. 1a shows a cross-section view of one exemplary embodiment of a variable blazed grating-based apparatus 100 operable to facilitate high speed optical signal processing. Throughout this document, the term "signal processing" includes attenuation, switching, phase shifting, or any other manipulation of one or more optical signals.

In this example, apparatus 100 includes a substrate 12 and a plurality of strips 14 disposed outwardly from substrate 12. In a particular embodiment, substrate 12 comprises a semiconductor substrate formed, for example, from silicon. Other materials could be used for substrate 12 without departing from the scope of the invention.

Each strip 14 has a width ($W_s$), and is separated from adjacent strips by a distance (d). The width ($W_s$) and the distance (d) define a periodicity associated with the strips. Multiple strips 14 are operable to receive a single input optical signal 20 having a beam width ($W_b$). Strips 14 are sized and spaced from one another in a manner to ensure that the width ($W_b$) of received optical beam 20 covers at least two strips 14. In this example, strips 14 residing at position 14' are spaced from substrate 12 by a distance 16. Although strips 14 are shown as generally rectangular in shape, any shape can be used consistent with the invention. In addition, although strips 14 are shown as having a constant width ($W_s$), that measurement could vary between strips, or even along the same strip 14.

As one particular non-limiting example of particular dimensions, the width of optical beam 20 may comprise approximately 21,000 nanometer, while each strip 14 comprises a width of approximately 3,000 nanometer (3 microns) and is spaced from adjacent strips 14 by approximately 600 nanometer. In this particular example, strips 14 are spaced from substrate 12 by approximately 2000 nanometer. These dimensions are provided for illustrative purposes only. Other device dimensions and configurations could be used without departing from the scope of the invention.

At least outer surface 15 of each strip 14 comprises an at least partially reflective material. It is not necessary for surface 15 to be completely or even mostly reflective. Of course, the more reflective the material or materials comprising outer surface 15, the less lossy the device will be. Reflective surface 15 may comprise the outer surface of strips 14 where strips 14 are formed from a reflective material. For example, strips 14 may be formed from a metal, such as aluminum, chromium, or gold. As a further example, strips 14 could be formed from polysilicon formed at a thickness sufficient to render the strips at least partially reflective of at least the wavelengths being processed by apparatus 100. Other materials could be used to form strips 14 without departing from the scope of the invention.

In another embodiment, reflective surface 15 may comprise a layer of reflective material disposed outwardly from another layer of strip 14. For example, strips 14 could be formed from a material, such as, silicon nitride, and a layer of partially reflective material 15 could be formed outwardly from strip 14. In that embodiment, the layer of material supporting layer 15 may, but need not be reflective of the incident signals.

Figure 1B:
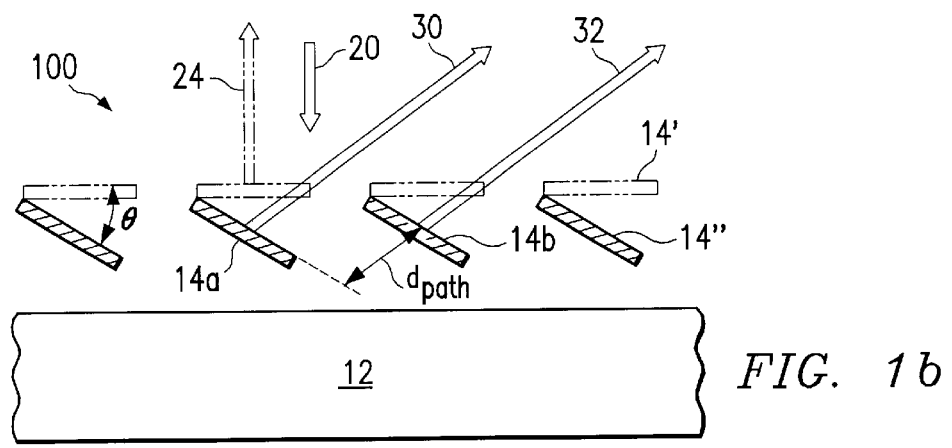

FIG. 1b illustrates one example of operation of apparatus 100. In this example, strips 14 receive optical input beam 20 at an angle normal to the surface of strips 14 at position 14.' Strips 14 at position 14' (shown in dotted lines) show apparatus 100 operating in "reflection mode," where strips 14 operate to reflect input optical beam 20 as reflected signal 24. In this case, because input beam 20 is oriented normally to the surfaces of strips 14, reflected beam 24 is communicated back in the same direction from which input beam 20 originated. As will be discussed below, non-normal input angles could also be used.

Strips at positions 14" (shown in solid lines) depict strips 14 during a second mode of operation, "diffraction mode." In diffraction mode, strips 14 are each rotated by approximately a blaze angle THETA from the original position of strips 14. In a particular embodiment, strips 14 can obtain a maximum blaze angle that is greater than two degrees. Implementing a design that facilitates a wide range of strip rotation provides significant advantages over other approaches by, for example, providing flexibility in system configuration. Input optical beam 20 impinges on surfaces 15 of strips 14. In this example, a first portion of input optical beam 20 impinges on strip 14a, while a second portion of beam 20 impinges on strip 14b, which is adjacent to strip 14a. While beam 20 may experience some scattering, because of the rotation of strips 14 to position 14", the majority of the diffracted portions of input beam 20 are directed in one direction, as illustrated (at least in part) by output rays 30 and 32.

Output ray 30 represents the portion of input beam 20 reflected by strip 14a at position 14" and output beam 32 represents the portion of input beam 20 that is reflected by strip 14b at position 14". Although FIG. 1b shows just two output rays 30 and 32, it should be appreciated that any strips 14' that receive a portion of input beam 20 will reflect an output portion in the direction indicated by arrows 30 and 32.

Because output rays 30 and 32 result from diffractions from surfaces laterally offset from one another and positioned at an angle to input beam 20, output rays 30 and 32 experience a relative difference ($d_{path}$) in their path lengths. This path length difference ($d_{path}$) results in a phase difference between the output rays. For a given wavelength and strip periodicity, apparatus 100 can introduce any level of phase difference between output rays by varying the angle THETA by which the strips 14 are rotated. When using a normal incident input beam 20, the diffracted output signal comprising a combination of diffracted rays, such as 30 and 32, is at a maximum when the path difference $d_{path}$ corresponds to one wavelength (or an integral multiple of wavelengths) of beam 20. Other path differences $d_{path}$ result in an attenuation of the output signal compared to the maximum condition.

Figure 1C:
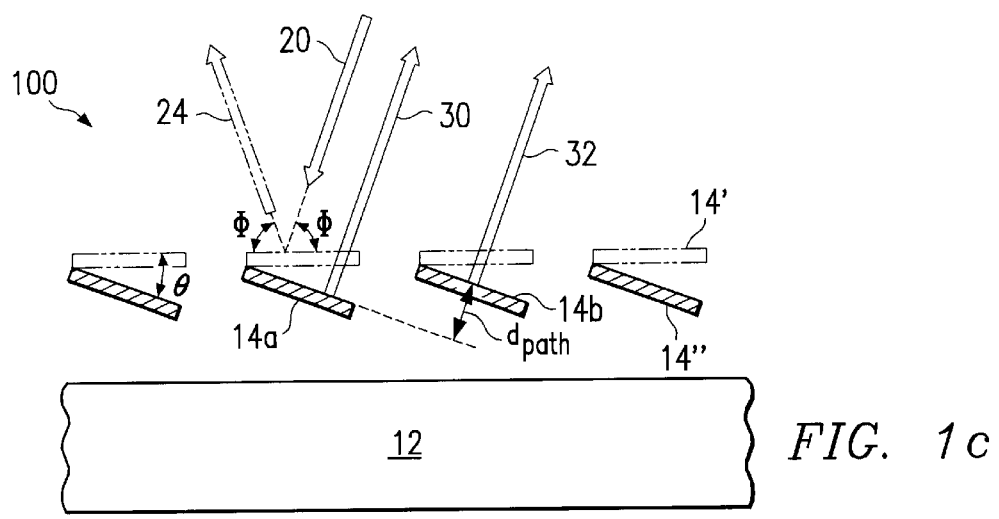

FIG. 1c illustrates another example of operation of apparatus 100. In this example, strips 14 receive optical input beam 20 at a non-normal angle PHI. In this particular example, the angle of incidence PHI of input beam 20 is equal to the angle of diffraction of output rays 30 and 32. As a result, the diffracted output rays travel back in the same direction as input beam 20. This condition is commonly referred to as the Littrow case.

In this embodiment, apparatus 100 operates in reflection mode when strips 14 reside at positions 14'. In that mode, input beam 20 impinges on strips 14 at angle PHI and is reflected as shown by output beam portion 24 at an angle of 180 degrees minus PHI. In diffraction mode, strips 14 reside at positions 14" at an angle THETA from position 14'. In this case, grazing angle PHI is selected to result in a diffraction angle that is approximately equal to the incident angle (ninety degrees minus PHI), resulting in input beam 20 being diffracted back in approximately the same direction as the origin of input beam 20, as shown by output rays 30 and 32.

Again, output rays 30 and 32 experience a relative path difference, which results in a relative phase shift between the signal portions. In this case, the beam portions experience a path difference before and after impinging on strips 14. As a result, the parallel distance between strips 14 at positions 14" equals one half of the resulting path difference. Operating blazed grating devices using non-normal incident angles—such as in the Littrow condition—can provide an advantage of facilitating the necessary phase shift between output rays while requiring only a portion of the strip rotation otherwise required. This results in less required drive voltage and more economical operation. Alternatively, the same drive voltage can be used with more rigid strips, facilitating faster device operation.

Previous systems using variable blazed gratings either implemented continuous deformable membranes or implemented multiple-piece membranes requiring very wide slats (typically ranging in width from nearly 60,000 nanometers (60 microns) to over 80,000 nanometer (80 microns)). The systems using slats require wide slats due to the high power of the optical signals being redirected and, as a consequence, are severely limited in their ability to rotate to change the blaze angle (typically limited to a maximum blaze angle of approximately 1.8 degrees).

One aspect of the present invention uses narrow strips, no wider than 40,000 nanometer (40 microns), to ensure greater blaze angle capabilities, lower drive voltage, and faster operation, while maintaining good contrast ratios and high output beam resolution as compared to other approaches.

The maximum switching speed, the minimum required drive voltages, and the maximum attainable blaze angle depend, at least in part, on the width of strips 14 and the ratio of that width to the space 16 separating strips 14 from substrate 12 (or another layer disposed outwardly from substrate 12). These devices operate by introducing a path difference $d_{path}$ between diffracted signal portions to create a desired phase shift between the portions. The path difference is typically some fraction of a wavelength of the signal being processed. In a particular embodiment, the spacing 16 can be selected to facilitate a maximum strip displacement of approximately one wavelength of the signal being processed. This facilitates introduction of any path difference up to a full wavelength of the signal.

For a given wavelength signal, the strip width and maximum strip displacement can be selected to provide any desired blaze angle. Typical telecommunication signals have wavelengths of approximately 1400–1600 nanometer. The following table shows example values of strip widths that can be useful using, for example, a 1400 nanometer maximum strip displacement.

Assuming maximum strip displacement=1400 nanometers,

| Maximum Blaze Angle | Strip Width |
| --- | --- |
| 2 degrees | 40 microns |
| 5 degrees | 16 microns |
| 7.5 degrees | 10.6 microns |
| 10 degrees | 7.9 microns |
| 15 degrees | 5.3 microns |
| 20 degrees | 3.8 microns |
| 25 degrees | 3.0 microns |
| 30 degrees | 2.4 microns |
| 45 degrees | 1.4 microns |

The foregoing table is intended to provide example dimensions only. Other device configurations could be used using other spacings 16, strip widths, and/or maximum blaze angles.

Various aspects of the present invention provide advantages over previous approaches by providing blazed grating having a number of narrow strips. Narrow strips facilitate larger maximum blaze angles for a given distance 16 from substrate 12. This provides increased flexibility in component configuration for applications using these devices. In addition, the narrow width of strips 14 allows the strips to be placed closer to substrate 12 while maintaining flexibility in the attainable blaze angles. Placing the strips closer to substrate 12 provides an advantage of reducing the energy needed to rotate the strips (whether in the form of an electrostatic force between the strips and the substrate or in the form of a forced caused by thermal expansion of a material between the substrate and the strips).

Moreover, reducing the width of strips 14 facilitates faster device operation and lower drive voltages. Using a number of narrow strips 14 further provides an advantage of increasing the resolution of the diffracted output of the device. One aspect of the invention recognizes that the resolution of the output signal comprising the majority of the diffracted portions of input beam 20 increases as the number of strips illuminated by input beam 20 increases. This aspect of the invention, therefore, facilitates enhancing the resolution of the diffracted output by sizing strips 14 so that input beam 20 illuminates a number of strips 14.

As will be discussed in more detail below, the ability of blazed grating apparatus 100 to selectively attenuate and/or switch optical input beams quickly, while requiring a low drive voltage and maintaining a good contrast ratio renders apparatus 100 useful in a myriad of applications, such as variable attenuators, gain equalizers, optical switches, and optical add/drop multiplexers, to name a few.

Figure 2A:
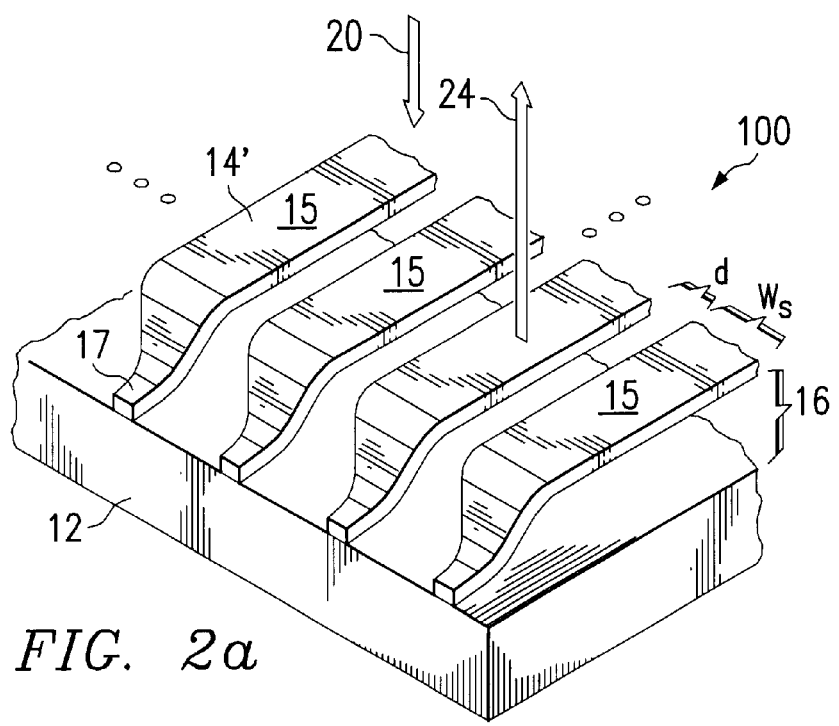
FIGS. 2a and 2b illustrate planar views of one particular embodiment of an apparatus operable to facilitate high speed optical signal processing according to the teachings of the present invention.
Figure 2B:
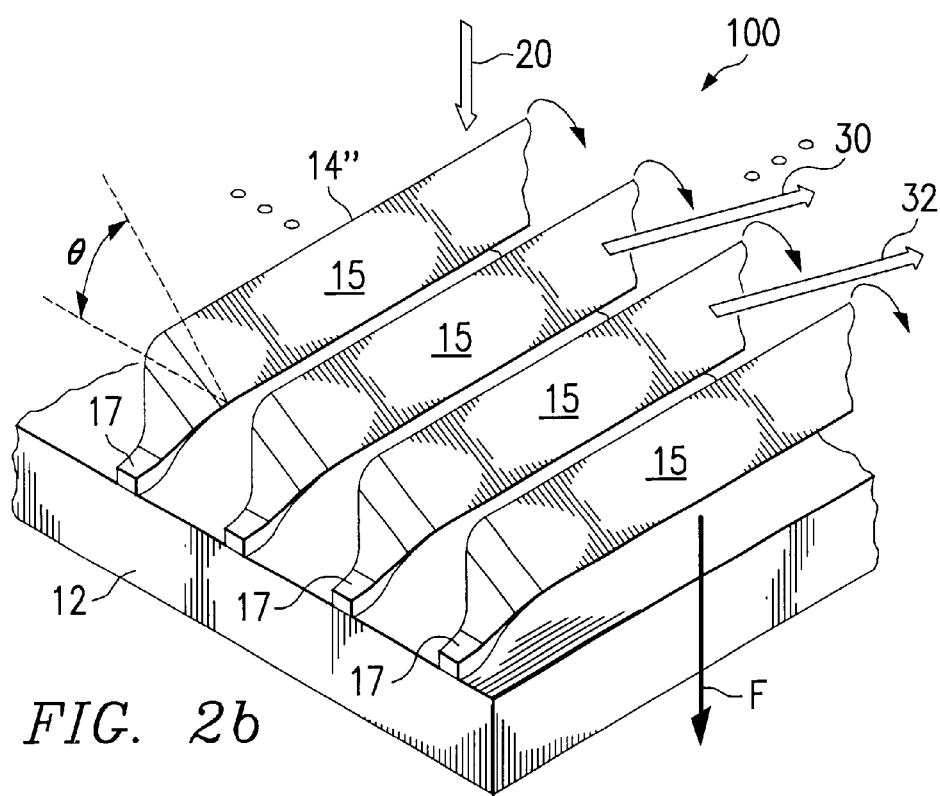

FIGS. 2a and 2b illustrate planar views of one particular embodiment of apparatus 100. As shown in these figures, strips 14 can be anchored to substrate 12 at anchor points 17. In this embodiment, anchor points have a width ($W_a$) that is smaller than the width ($W_s$) of at least a portion of strip 14. In this manner, strips 14 operate to undergo a partial rotation as shown in FIG. 2b when a force (F) is applied to one side of each strip 14. Apparatus 100 controls the grating angle THETA by applying a selected level of force (F) in selected locations of strips 14. Other methods of anchoring strips 14 to facilitate rotation could be used consistent with the invention.

Figure 3A:
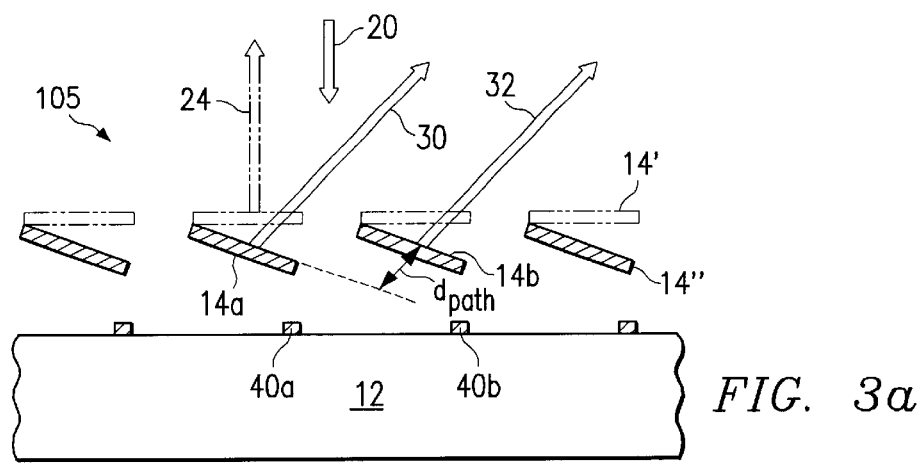
FIGS. 3a–c are cross-sectional and planar diagrams showing one example of a blazed grating device constructed according to the teachings of the present invention.
Figure 3B:
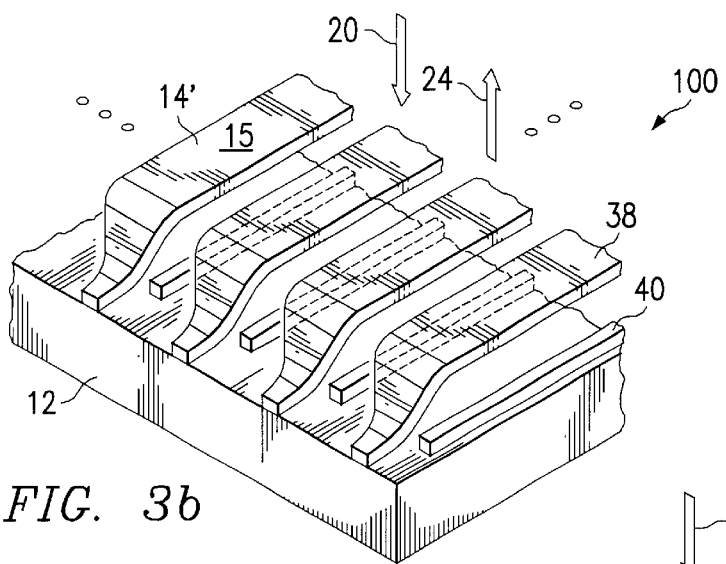
Figure 3C:
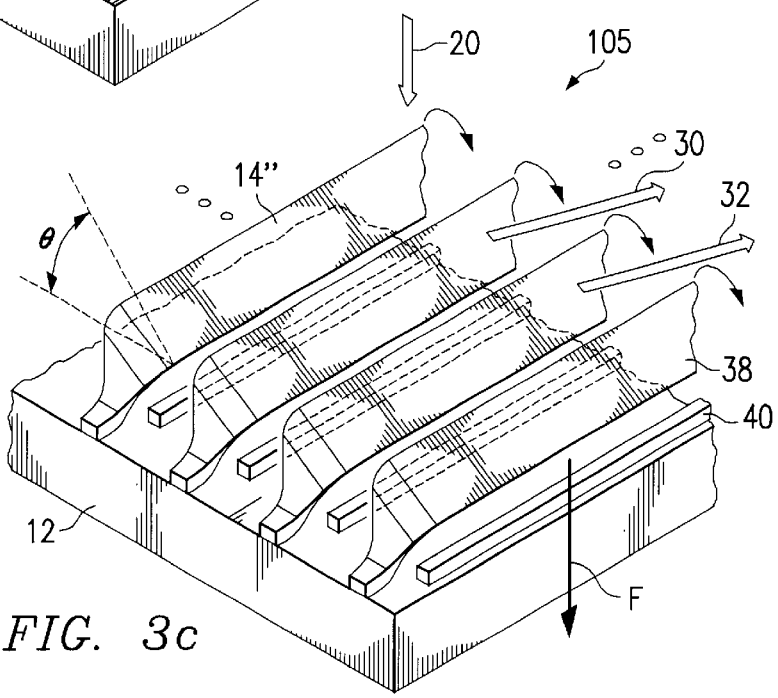

FIGS. 3a–c are cross-sectional and planar diagrams showing one example of a mechanism operable to generate and apply a force (F) to cause a partial rotation of strips 14 in a blazed grating apparatus 105. The illustrated embodiment assumes that force (F) is an electrostatic force generated by a voltage differential between an inner conductive layer and at least a portion of grating 14. Alternatively, force (F) could comprise a force pushing up on strips 14 and created by applying a heat source to the inner conductive layer causing that layer to physically expand and push up on a portion of strip 14, causing strip 14 to rotate. In that embodiment, the inner conductive layer could be considerably thicker than the embodiment shown in FIGS. 3a–3c.

Apparatus 105 is similar in structure and operation to apparatus 100 shown in FIGS. 1–2. In one particular embodiment, strips 14 can be constructed from an at least substantially conductive material. For example, strips 14 may be formed from a metal such as aluminum, gold, or titanium, or may be formed from polysilicon. Where strips 14 are formed from polysilicon, the strips may, if desired, be doped to achieve additional conductivity.

The illustrated embodiment of apparatus 105 includes an inner conductive layer 40, which in this case takes the form of a plurality of elongated conductors, each disposed inwardly from one side of(perhaps along an edge 38 of) strip 14 that is desired to be pulled toward substrate 12. Each conductor of inner conductive layer 40 may be formed, for example, from a metal such as aluminum, chromium, or gold. Other at least substantially conductive materials could be used without departing from the scope of the invention. Although this example assumes creation of an electrostatic force (F), similar results could be obtained by thermally expanding the inner conductive layer to cause a rotation in strip 14.

By applying a voltage difference between conductors 40 and strips 14 desired to be rotated, an electrostatic force (F) is generated that acts to pull edge 38 of strip 14 toward conductor 40. This, in turn, operates to partially rotate strip 14 as shown in FIG. 3c. The voltage difference between strips 14 and conductors 40 may be established, for example, by grounding strips 14 while applying a voltage to conductors 40, grounding conductors 40 while applying a voltage to strips 14, or applying a differential voltage between strips 14 and conductors 40. In the illustrated example, a common voltage (or ground) is applied to all strips 14. Alternatively, selected strips 14 could be rotated while others remain stationary.

Figure 4A:
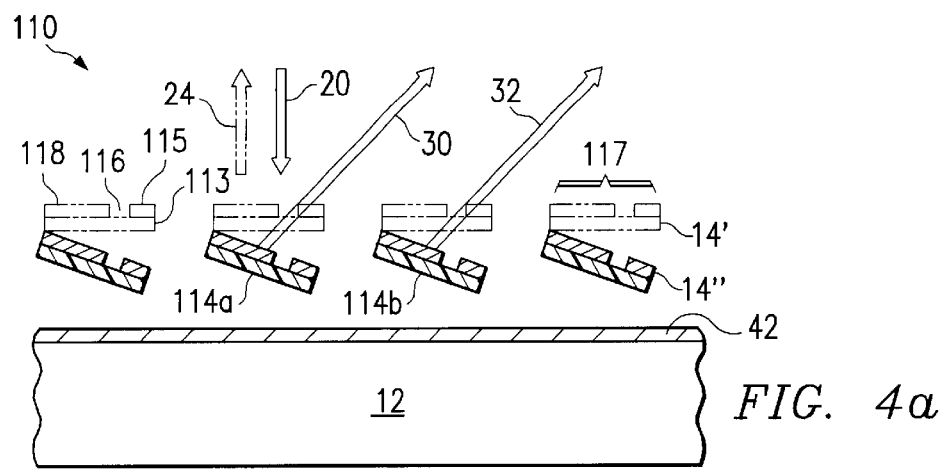
FIGS. 4a–c are cross-sectional and planar diagrams showing another example of a blazed grating device constructed according to the teachings of the present invention.
Figure 4B:
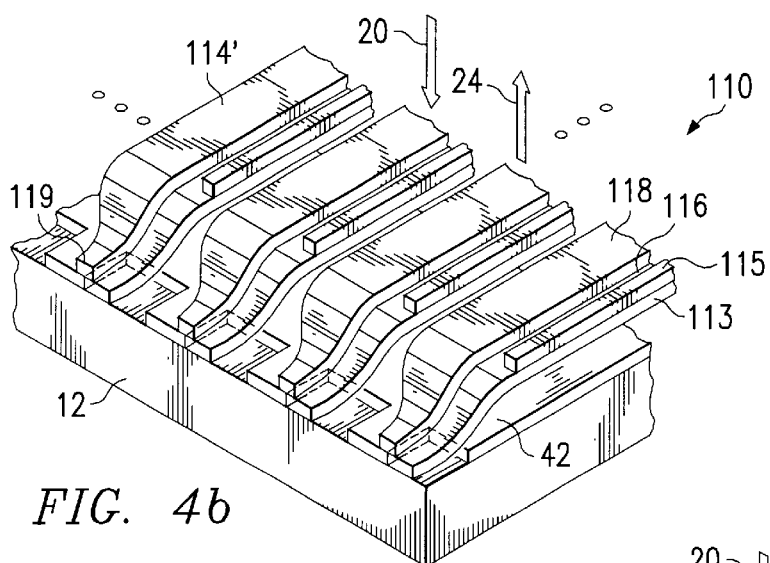
Figure 4C:
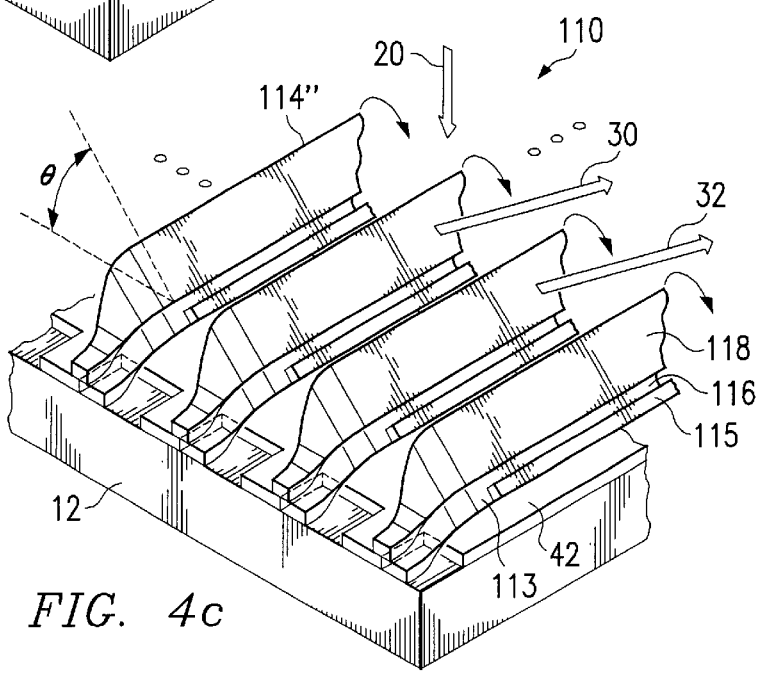

FIGS. 4a–4c are cross-sectional and planar diagrams showing another example of a mechanism operable to generate and apply a force (F) to cause a partial rotation of strips 114 in an apparatus 110. In this example, strips 114 are similar in function to strips 14 of FIGS. 1–3. However, in this case, strips 114 each comprise a multi-layered structure. In this example, each strip 114 includes a layer of insulating material 113. Insulating material 113 may comprise, for example, silicon nitride, oxide, or any other substantially insulating material.

In the illustrated embodiment, a layer 117 of material that is at least partially reflective is formed outwardly from layer 113 of insulating material. For example, layer 117 may comprise a metal or doped polysilicon. Layer 117 includes a first portion 115 and a second portion 118. Portions 115 and 118 are electrically separated, in this example by a channel 116. Channel 116 may comprise an open channel, or may be filled with an insulating material, such as oxide, or silicon nitride.

Portions 115 and 118 may be formed, for example by first forming a continuous layer 117 of material, and then etching channel 116 to form the first and second portions on either side of channel 116. Alternatively, portions 115 and 118 may be formed by first masking channel 116, and then forming first and second portions 115 and 118 14 on either side of channel 116. First and second portions 115 and 118 may, but need not be formed from the same material.

Blazed grating apparatus 110, like apparatus 105, also includes an inner conductive layer. While apparatus 105 includes an inner conductive layer 40 in the form of a plurality of elongated conductors, apparatus 110 comprises an inner conductive layer 140 in the form of a continuous conductor layer disposed outwardly from substrate 12. In an alternative embodiment, inner conductive layer 140 could comprise substrate 12, where substrate 12 comprises a substantially conductive material, such as metal or doped polysilicon. Inner conductive layer 40 may comprise any configuration of at least substantially conductive material operable to cause a partial rotation of some or all of strips 14.

As illustrated, for example, by FIGS. 4b and 4c, first portion 115 of reflective conducting layer 117 is at least substantially electrically isolated from inner conductive layer 140. Second portion 118 of reflective conducting layer 117, however, is electrically coupled to inner conductive layer 140, in this case, by physically contacting that layer at region 119. This construction, and others similar to it, maintain a partially reflective outer surface of strips 114, while facilitating creation of a voltage differential between inner conductive layer 140 and only the edges of strips 114 that carry first portions 115 of conductive reflecting layer 117. This, in turn, facilitates partial rotation of strips 114 upon application of a differential voltage between inner conductive layer 140 and first portions 115 of strips 114.

In operation, blazed grating apparatus 110 receives optical input beam 20, in this example, at a normal angle of incidence. Although this description assumes a normal angle of incidence for optical beam 20, non-normal incident angles could be used without departing from the scope of the invention. In reflection mode (as indicated in FIG. 4a by dashed lines) apparatus 110 substantially reflects input optical beam 20 back in the same direction as output beam 24. In diffraction mode, apparatus 110 diffracts input optical beam 20 primarily in a direction as indicated by output rays 30 and 32. By varying the angle THETA between strip position 114' position 114", apparatus 110 can control the phase difference introduced between rays 30 and 32, and therefore control the intensity of the output signal.

In this example, rotation of strips 114 is accomplished by creating a voltage differential between inner conductive layer 140 and first portion 115 of reflective conducting layer 117. Because second portion 118 of reflective conducting layer 117 is electrically coupled to inner conductive layer 140, little or no electrostatic force is generated between inner conductive layer 140 and second portion 118 of reflective conducting layer 117. Because, however, first portion 115 of reflective conducting layer 117 is electrically isolated from inner conductive layer 140, a voltage difference between those substantially conducting structures creates an electrostatic force, which operates to pull first portion 115 toward inner conductive layer 140. This, in turn, operates to partially rotate strip 114, causing diffraction of the majority of input beam 20 in one direction as indicated by output rays 30 and 32. The example shown in FIG. 4 is intended to illustrate one possible embodiment of apparatus 110. Various changes to the configuration and materials described herein could be made without departing from the scope of the invention.

Figure 5A:
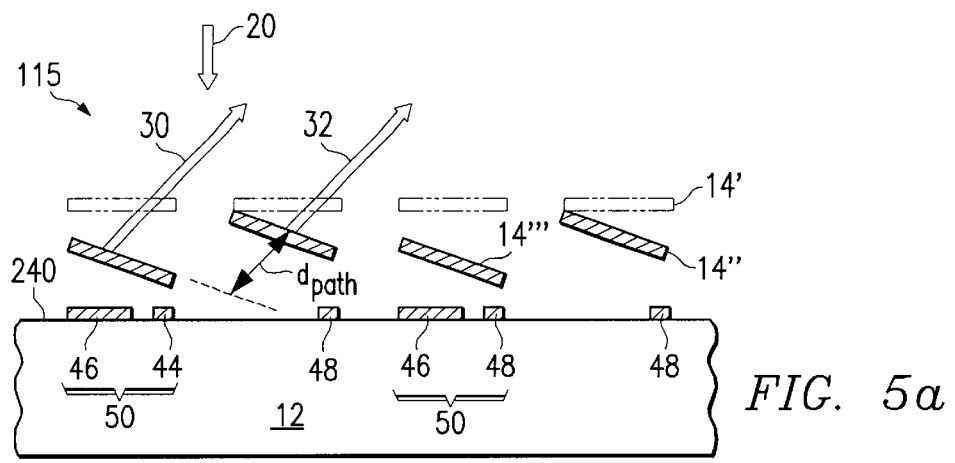
FIGS. 5a–c are cross-sectional and planar diagrams showing still another example of a blazed grating device constructed according to the teachings of the present invention.
Figure 5B:
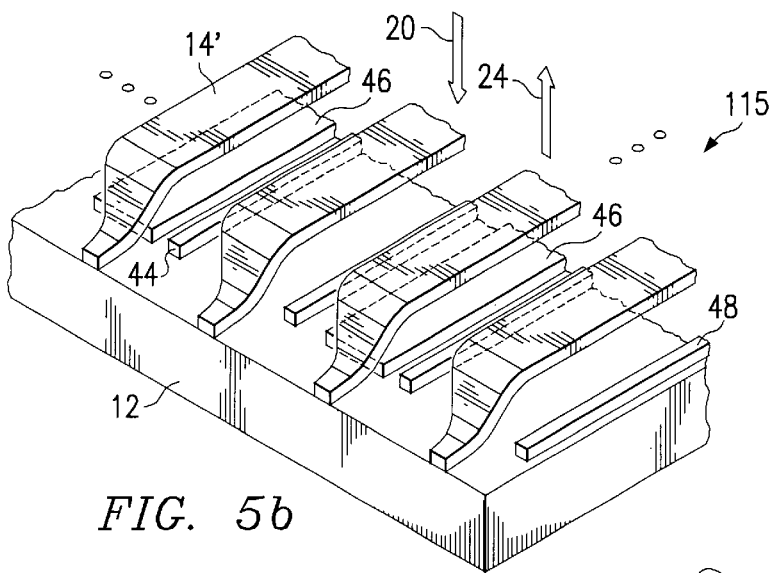
Figure 5C:
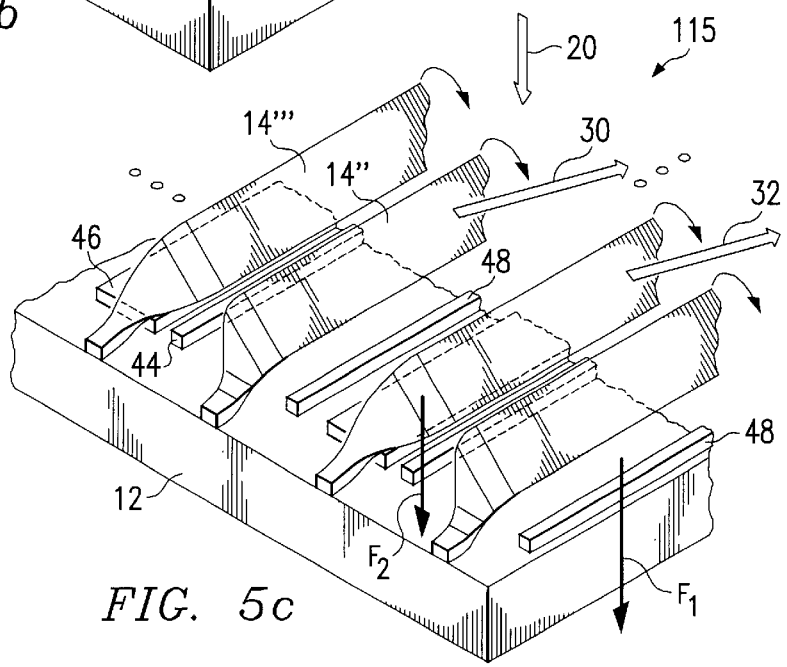

FIGS. 5a–5c are cross-sectional and planar diagrams showing still another example of a mechanism operable to generate and apply a force (F) to cause a partial rotation of strips 14 in a blazed grating apparatus 115. In addition, the embodiment shown in FIGS. 5a–c operates to cause alternate strips 14 to not only partially rotate, but also to move in their entirety toward substrate 12. The result of this alternating strip translation is a diffraction mode of operation wherein all strips 14 are partially rotated, and wherein alternate strips reside in different planes relative to their adjacent strips 14. This configuration can provide additional phase shift between diffracted output rays for a given angle THETA of strip rotation.

In this example, strips 14 are similar in structure and function to strips 14 shown in FIGS. 3a–3c. Strips 14 may comprise any material or combination of materials operable to render an at least substantially conductive and at least partially reflective strip 14. The illustrated embodiment of apparatus 115 includes an inner conductive layer 240. Inner conductive layer 240 in this embodiment, comprises alternating sets of single elongated conductors 48 and pairs 50 of conductor sets 44 and 46, all disposed outwardly from substrate 12. Single elongated conductors 48 and conductors 46 of set of conductors 50 reside approximately inwardly from the edges of strips 14 desired to be rotated toward substrate 12. Conductors 46 also reside inwardly from strips 14, but are electrically separated from conductors 44. The illustrated embodiment provides just one example of a conductor configuration operable to achieve the above-described results. Other configurations could be used without departing from the scope of the invention.

In operation, where it is desired to switch blazed grating apparatus 115 from a reflection mode to a diffraction mode, a voltage differential is created between strips 14 and inner conductive layer 240. In this particular embodiment, a first voltage differential is created between strips 14 and conductors 26, and a second and larger voltage differential is created between strips 14 and conductors 44 and 48. Creating a voltage differential between edges 38 of each strip and the conductors 44 and 48 residing inwardly from those edges causes all strips to rotate. In addition, creating a voltage differential between all or a portion of the remainder of alternated strip cross sections and conductors 46 causes alternate strips to move inwardly relative to adjacent strips. By creating a larger voltage differential between strips 14 and conductors 44, 48 (which pull edges 38 toward substrate 12) than the differential between strips 14 and conductors 46 (which pull edges opposite edges 38 of the alternate strips toward substrate 12), this arrangement facilitates rotating all strips 14 while pulling alternate strips 14 closer to inner conductive layer 240 than adjacent strips 14.

In a reflection mode of operation, blazed grating apparatus 115 receives optical input beam 20, and reflects beam 20 at an angle equal to the angle of incidence of beam 20. Where strips 14 receive beam 20 at a normal incident angle, output beam 24 is reflected at an angle normal to strips 14. In a diffraction mode of operation, all strips 14 partially rotate toward substrate 12, and alternate strips 14 move inwardly toward substrate 12. The motion of strips 14 results in a phase shift between portions of the output beam, which may create constructive or destructive interference, depending on the grating angle THETA and amount of relative motion between adjacent strips.

Although this example describes a normal incident input beam, other angles of incidence could be used.

Figure 6A:
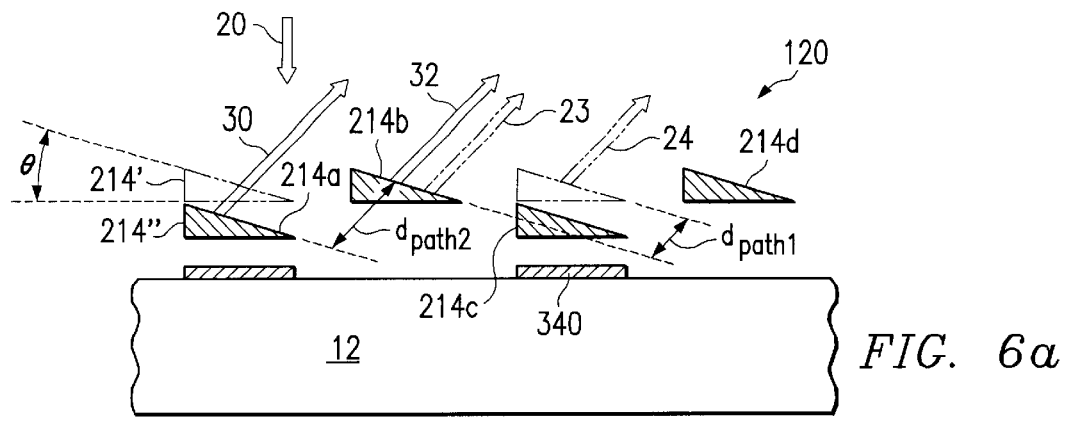
FIGS. 6a–c are cross-sectional and planar diagrams showing yet another example of a blazed grating device constructed according to the teachings of the present invention.
Figure 6B:
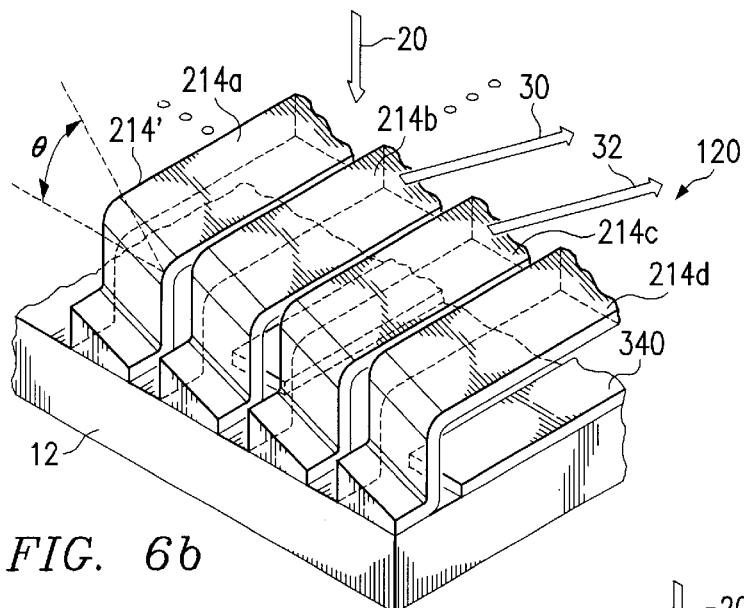
Figure 6C:
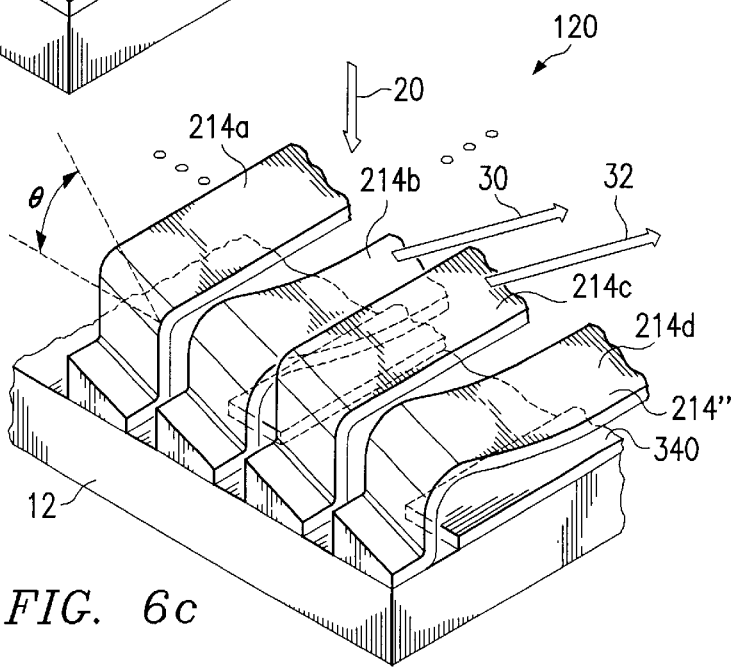

FIGS. 6a–6c are cross-sectional and planar diagrams showing still another embodiment of a blazed grating apparatus 120. Blazed grating apparatus 120, in this embodiment, includes a plurality of adjacent strips 214 disposed outwardly from substrate 12. In this example, each strip 214 has an approximately triangular shaped cross-section. Each strip comprises an outer surface 215 formed at an angle THETA to its inner surface 211. In a particular embodiment, each strip 214 may be formed from one or more at least partially reflective and at least substantially conductive materials.

Strips 214 may be formed, for example, by repeatedly disposing layers of conductive reflective material, one on top of the other, and after each new layer is disposed, etching a portion of the new layer to expose a portion of the underlying layer. By repeating those processing steps, a staircase-like structure can be formed comprising numerous layers of reflective conductive material, wherein the staircase provides an approximate angle THETA measured from the base of the staircase to its top point.

Apparatus 120 includes an inner conductive layer 340 disposed outwardly from substrate 12 and inwardly from strips 214. In this embodiment, inner conductive layer 340 comprises a plurality of at least substantially conductive strips 340 disposed inwardly from alternate strips 214. As a particular example, conductors of inner conductive layer 340 may comprise strips having a width approximately equal to the width of strips 214. Other configurations of inner conductive layer 340 may be used without departing from the scope of the invention.

In operation, blazed grating apparatus 120 receives optical beam 20, in this case at a normal incident angle, and diffracts optical beam 20 so that a majority of the diffracted beam travels in one direction as shown by output rays 30 and 32. When strips 214 reside at location 214', a path difference ($d_{path1}$) is created between output rays. For a given wavelength and a given strip periodicity, the path difference between output beam portions is dependent on the angle THETA that outer surface 215 of strips 214 makes with inner surface 211 of strips 214. In one mode of operation, this angle THETA can be selected, for example, to provide a path difference of one wavelength of optical beam 20 when strips 214 reside at position 214'. In that case, the diffracted output rays constructively interfere to render a maximum intensity output.

In a diffraction mode, alternate strips 214 are pulled toward substrate 12. This may be accomplished, for example, by creating a differential voltage between alternate strips 214 and conducting strips 340 corresponding to those strips 214. Pulling alternate strips 214 toward substrate 12 creates an increased path difference ($d_{path2}$) between output rays 30 and 32. This increased path difference results in a further phase difference between output rays 30 and 32.

The variable blazed grating apparatus depicted in FIGS. 1–6 can be useful in a myriad of applications. For example, FIGS. 7a and 7b illustrate variable optical attenuators using blazed grating technology. In particular, FIG. 7a illustrates a variable attenuator 500 operable to receive optical input beam 20 at a normal incident angle and to introduce any desired amount of attenuation into that signal by controlling the grazing angle THETA between blazed grating 10 at position 14' and position 14".

For a given wavelength of optical beam 20 and for a given periodicity of blazed grating 14, variable attenuator 500 can control the amount of phase shift between output rays 30 and 32 by selectively controlling the angle THETA of blazed grating 10 between position 14' and 14". Blazed grating 10 residing at position 14" operates to diffract the majority of input optical beam 20 in substantially one direction. Path differences between diffracted output rays result in interference, affecting the intensity of the output beam.

For example, where diffracted rays 30 and 32 are used as an output and when using an approximately normal incident input signal, by choosing an angle THETA to result in a path difference ($d_{path}$) of one wavelength, output rays 30 and 32 constructively interfere with one another, maximizing the intensity of the output beam. At the opposite end of the spectrum, by choosing an angle THETA to result in a path difference ($d_{path}$) of one-half wavelength (or an odd multiple thereof), output rays 30 and 32 destructively interfere with each other to completely cancel the output beam. Selectively controlling the position of blazed grating 10 through a control voltage attenuator 500 to provide any level of output signal between zero and maximum intensity.

The foregoing example has assumed that diffracted rays 30 and 32 are used as an output to attenuator 500. Alternatively, reflected rays, such as ray 24 could serve as the output to attenuator 500. In that embodiment, the intensity of rays 24 is a maximum when blazed grating 10 operates to reflect substantially all of input beam 20. As the diffraction efficiency of blazed grating 30 increases, the intensity of reflected output rays 24 generally decreases. Blazed grating 10 can, therefore, selectively attenuate output rays 24 relative to input beam 20 by changing its position in response to a control signal thereby changing the diffraction efficiency of diffracted rays 30 and 32, and the intensity of reflected rays 24.

FIG. 7b illustrates another variable attenuator 510. Variable attenuator 510 is similar in structure to variable attenuator 500 shown in FIG. 7a. Variable attenuator 510, however, operates with an input optical beam 20 having a non-normal incident angle. In particular, in this embodiment variable attenuator 510 operates in the Littrow condition where the angle of incidence of optical beam 20 equals the angle of diffraction of output portions 30 and 32. As previously discussed, this configuration facilitates attaining a given phase difference while requiring only a portion of the blazed grating displacement associated with other configurations.

Variable attenuators implementing blazed grating technology provide a significant advantage of increasing the efficiency and performance of the device, by diffracting a majority of the input beam in a single direction. For example, one embodiment of the invention increases the intensity of the output beam, without requiring additional optical components to collect and recombine diffracted output portions traveling in different directions.

By implementing variable blazed gratings, such as those depicted in FIGS. 1–6, one aspect of the invention facilitates true variability in attenuation by providing a plurality of strips having widths no greater than 40 microns, thus ensuring a wide selection of blaze angles. Unlike other approaches, which are limited to blaze angles of less than two degrees, and therefore limited variation in the amount of attenuation introduced, this aspect of the invention provides an advantage of true variable attenuation. In another aspect of the invention, the apparatus shown in FIGS. 1–6 can operate as a digital switch, for example, by configuring grating 14 to vary its position so that path difference ($d_{path2}$) results in an odd multiple of one-half wavelengths of the input optical beam. In that manner, the apparatus can be operated to switch between a first state where output rays constructively interfere to provide a maximum output and a second state where output rays destructively interfere to reduce or eliminate the output beam.

By appropriate selection of, for example, material type, amounts of materials, grating dimensions, strip tensions, and/or drive voltages, one aspect of the invention facilitates tuning of switching speeds to maximize switching efficiency. This can be extremely useful in tuning switching speeds to correspond to, for example, common information packet sizes.

For example, the following table shows IP packet sizes in bytes and the total number of packets percent bytes during the years 1998 and 1999.

| PACKET SIZE (IN BYTES) | TOTAL PACKETS (%) | TOTAL BYTES (%) |
| --- | --- | --- |
| 40 | 38.9 | 4.4 |
| 1,500 | 11.5 | 48.7 |
| 552 | 10.1 | 15.8 |
| 44 | 6.1 | 0.8 |
| 576 | 4.9 | 7.9 |

This data shows that almost fifty percent of IP packets are between 40 and 44 bytes long. Assuming a data rate of 2.5 Gigabytes per second, switching these packets takes approximately 128 nanoseconds. Thus, for current packet sizes and data rates, a switching speed of approximately 100 nanoseconds is desirable. Existing switching technologies are either too expensive, or too slow for this application. For example, Lithium Niobate, semiconductor optical amplifiers, or electro-absorption modulators can switch in less than one nanosecond, a rate much faster than the optimal 100 nanosecond rate. These devices are prohibitively expensive, particularly when compared to the present invention. In addition, these devices tend to be polarization sensitive. Liquid crystal devices, thermo-optic devices, and micro-electro-optic switches using a single continuous membrane as a moveable mirror are capable of switching speeds of only up to one microsecond, too slow for optimal operation. Likewise, approaches using wide slightly rotatable slats to form a variable diffraction grating for high power spectral analyzers are too slow and inflexible in configuration for these applications.

One aspect of the present invention facilitates tuning an optical switch element to provide a desired switching speed. In a particular embodiment, the switch element can be tuned to provide a switching speed commensurate with a specified packet size or range of packet sizes. For example, the switch element can be tuned to provide switching speeds commensurate with average packet sizes encountered by the switch element. Various embodiments of the present invention facilitate switching speeds of up to 20 nanoseconds, and can be tuned to provide an optimum switching speed of, for example, approximately 100 to 300 nanoseconds.

A separate aspect of the invention, which is not necessarily applicable to only those embodiments shown in FIGS. 1–6 of this disclosure, recognizes that variable blazed gratings, both those described above and some pre-existing designs, can be combined with other optical components in novel ways to provide useful optical signal processing functions. For example, FIG. 8 shows a system 531 using a variable blazed grating 10 coupled to a circulator 502.

In some aspects of operation, variable blazed gratings operate to reflect or diffract signals along the signal path of the same or another input signal. To avoid interference between the input signal and the output of the blazed grating, it is desirable to redirect the output signal from the path of the input signal. FIG. 8 shows an example of a variable blazed grating 10 receiving an optical input signal 520 at a normal incident angle to the grating. In this example, input signal 520 is reflected back along the path of input signal 520 as an output signal 504'. A circulator 502 receives the reflected signal 504' and redirects that signal as output signal 504 away from the path of input 520

Although this example shows input signal 520 received at a normal incident angle, this aspect of the invention is equally applicable to non-normal incident angles. In addition, although this example shows output signal 504' reflected back along the signal path of its own input signal, the invention can also apply to signals that are reflected or diffracted into the input path of another optical signal. This aspect of the invention finds application anywhere an output signal is directed from a variable blazed grating into the path of an incoming signal.

System 531 advantageously couples a circulator with the variable blazed grating to redirect the output signal 504' without incurring a three decibel loss between redirected output signal 504 and reflected output signal 054', as has been the case in previous approaches using beam splitters to redirect signals. In addition, circulator 502 operates to isolate reflected output signal 504' from adversely affecting input signal 502. The unique combinations of variable blazed gratings and circulators facilitates system configurations in optical switches, optical add/drop multiplexers, and wavelength division add/drop multiplexers to name a few examples.

FIGS. 9a–9b are block diagrams illustrating particular examples of 1×2 optical switches using variable blazed grating devices 10 coupled to optical circulators. Optical switch 600 utilizes an optical input beam 20 having a normal angle of incidence. In addition to blazed grating device 10, optical switch 600 includes a circulator 602 coupled between input beam 20 and strips 14 of blazed grating 10.

Optical switch 600 can switch input beam 20 to a first output 604 or a second output 606, depending on the position of blazed grating 10. In a reflection mode of operation, where blazed grating 10 resides at position 14', input optical beam 20 is reflected off of blazed grating 10, and back to circulator 602 where the signal is routed to first output 604. Optical switch 600 can switch input optical beam 20 to second output 606 by displacing blazed grating 10 to position 14". In this position, a majority of input optical beam 20 will be diffracted in a single direction, in this case the direction indicated as output 606. For a given wavelength of optical input beam 20 and a given periodicity of blazed grating 10, an angle THETA can be selected to result in a full wavelength phase difference between diffracted portions of input beam 20 to result in a maximum input intensity.

FIG. 9b illustrates an example of another 1×2 optical switch 610. In this case, optical switch 610 operates with a non-normal incident optical signal 20. In particular, optical switch 10 operates in the Littrow condition where the angle of incidence of optical beam 20 equals the angle of diffraction of the output rays.

In a reflection mode of operation, optical switch 610 can communicate optical input beam 20 toward first output 614 by having that beam reflected off of blazed grating 10 positioned at location 14'. Optical switch 610 can also switch input optical beam 20 to second output 616 by operating in a diffraction mode where blazed grating 10 is displaced to position 14", and input beam 20 is diffracted back toward a circulator 612. Circulator 612 directs the output beam toward second output 616. By using non-normal angles of incidence, the angle THETA necessary to achieve the desired phase shift can be reduced as compared to other configurations.

FIGS. 10a–10d are block diagrams illustrating various embodiments of 2×2 optical switches constructed from variable blazed gratings and optical circulators. FIGS. 10a and 10b show an embodiment using one normal incident and one non-normal incident input signal.

FIGS. 10c and 10d show an embodiment using two non-normal incident input signals.

In the embodiment shown in FIGS. 10a–10b, 2×2 optical switch 700 receives one optical input beam 20a at a normal incident angle, and receives another optical input beam 20b at a non-normal incident angle. FIG. 10a illustrates operation of 2×2 optical switch 700 in a reflection mode. In reflection mode of operation, optical switch 700 receives input optical beams 20a and 20b, and reflects each signal at an angle equal to its angle of incidence. In particular, blazed grating 10 residing at position 14' receives input optical beam 20a at a normal incident angle and reflects that beam back to a circulator 702, which directs the beam to first output 704. In a similar manner, blazed grating 10 residing at position 14' receives input optical beam 20b at angle PHI and reflects that signal toward a partially reflective surface 711, which is positioned to reflect a signal back toward blazed grating 10 at the same angle PHI and ultimately back to a circulator 708, which directs the beam to second output 706.

FIG. 10b illustrates the same optical switch 700 operating in a diffraction mode. In diffraction mode, blazed grating 10 is displaced to position 14" at an angle THETA from position 14'. Blazed grating 10 receives optical input beam 20a and diffracts a majority of that beam toward circulator 708, which directs that portion of the beam to output 706. In a similar manner, blazed grating 10 positioned at location 14" receives input optical beam 20b and diffracts a majority of that beam toward circulator 702, which directs the beam toward output 704.

In the embodiment shown in FIGS. 10c–10d, 2×2 optical switch 700 receives both optical input beams 20a and 20b at a non-normal incident angle and operate in a Littrow condition. FIG. 10c illustrates operation of 2×2 optical switch 700 in a reflection mode. In reflection mode of operation, optical switch 700 receives input optical beams 20a and 20b, and reflects each signal at an angle equal to its angle of incidence. In particular, blazed grating 10 residing at position 14' receives input optical beams 20a and 20b at angle PHI and reflects those signals toward circulator 702 and 708. Circulators 702 and 708 redirect the reflected signals from the path of input signals 20a and 20b to avoid interference between the signals.

FIG. 10d illustrates the same optical switch 700 operating in a diffraction mode in the Littrow condition. In diffraction mode, blazed grating 10 is displaced to position 14" at an angle THETA from position 14'. Blazed grating 10 receives optical input beam 20b and diffracts a majority of that beam back toward circulator 708, which directs that portion of the beam to output 706. Blazed grating 10 positioned at location 14" also receives input optical beam 20a and diffracts a majority of that beam toward circulator 702, which directs the beam toward output 704.

These examples show two particular configurations for using a blazed grating as a 2×2 optical switch. It should be noted that any number of 2×2 optical switches can be combined to form an array of nxn switches. Moreover, although particular configuration has been described with respect to FIGS. 10a–10d, numerous modifications could be made without departing from the scope of the invention. For example, switches implementing different geometric configurations, or different numbers of blazed grating elements, circulators, reflective surfaces, or other optical elements are contemplated as being within the scope of the invention.

FIGS. 11a–11h show illustrative examples of various embodiments of optical add/drop multiplexers using blazed grating technology coupled with optical circulators. FIGS. 11a–11b show examples of a reflection mode of operation and a diffraction mode of operation, respectively, of one embodiment of an optical add/drop multiplexer 800 using a blazed grating 10. In this embodiment, reflection mode of add/drop multiplexer 800 corresponds to a pass-through mode of operation. In this example, blazed grating element 10 receives input optical beam 820a at a non-normal incident angle PHI, and is operable to receive added optical beam 820b at a normal incident angle. While blazed grating 10 resides at position 14', input optical beam 820a is reflected from to a mirror 811, which reflects the signal back to blazed grating 10 and on to a circulator 806. Circulator 806 directs input optical beam 820a to output port 806 for pass through operation.

This embodiment of add/drop multiplexer 800 facilitates add/drop operation by operating in a diffraction mode. In this example, for operation in add/drop mode, blazed grating 10 is displaced to position 14" at an angle THETA to its original position 14". Input optical beam 820a impinges on blazed grating 10 at position 14". The majority of input optical beam 20a is diffracted in a single direction, in this case, toward circulator 802, which directs those diffracted portions of input beam 820a toward drop port 806. Blazed grating 10 residing at position 14" receives added optical signal 820b and diffracts the majority of that signal toward circulator 808, which receives the majority portions of the diffracted added signal 820b, and directs those signal portions to output port 806.

Add/drop multiplexer 800 provides an advantage of facilitating pass-through operation when no voltage is applied to blazed grating elements 10. In this manner, multiplexer 800 facilitates some level of fault tolerance, in the event of a failure of one or more blazed grating elements 10.

FIGS. 11c–11d show additional examples of a reflection mode of operation and a diffraction mode of operation, respectively, of another embodiment of an optical add/drop multiplexer 805 using a blazed grating 10. Add/drop multiplexer 805 is similar in structure and function to add/drop multiplexer 800, but uses different ports for receiving input and added signals 820a, 820b.

In this embodiment, reflection mode of add/drop multiplexer 805 corresponds to an add/drop mode of operation. In this example, blazed grating element 10 receives input optical beam 820 at a normal incident angle, and receives added optical beam 820b at a non-normal incident angle PHI. With blazed grating 10 residing at position 14', input optical beam 820a is reflected back to a circulator 802, which directs input optical beam 820a to be dropped at port 804. blazed grating 10 receives added optical beam 820b at incident angle PHI, and reflects that beam toward a mirror 811. Mirror 811 reflects the beam back to blazed grating 10 at the same angle PHI, causing added signal 820b to be directed toward a circulator 808. Circulator 808 communicates added signal 820b as output 806.

This embodiment of add/drop multiplexer 805 facilitates pass-through operation by operating in a diffraction mode. In this example, for operation in pass-through mode, blazed grating 10 is displaced to position 14" at an angle THETA to its original position 14". Input optical beam 820a impinges on blazed grating 10 at position 14". The majority of input optical beam 20a is diffracted in a single direction, in this case, toward circulator 808, which directs those diffracted portions of input beam 820a toward output 806.

Although FIGS. 11a–11d depict configurations where circulator 802 couples to drop port 804 and circulator 808 couples to output port 806, the invention also contemplates coupling circulator 802 to output port 806 and coupling circulator 808 to drop port 804. In a manner analogous to that described above, input signal 820a and added signal 820b can each be applied along the path of circulator 802 or circulator 808, depending on the particular device characteristics desired.

FIGS. 11e–11f show still another example of an add/drop multiplexer 810 and its operation in a reflection mode and a diffraction mode, respectively. Optical add/drop multiplexer 810 operates to receive input optical beams at non-normal angles of incidence PHI. To operate in a pass-through mode, optical add/drop multiplexer 810 operates in reflection mode. In that case, blazed grating 10 remains at position 14', where it receives optical input signal 820a at incident angle PHI, and reflects that signal at an angle equal to 180° minus PHI toward a circulator 818. Circulator 818 receives optical input beam 820a and directs that beam toward an output 816.

FIG. 11f shows the same optical add/drop multiplexer 810 operating in a diffraction mode of operation to effect dropping of the input optical beam 820a in favor of an added optical beam 820b. In particular, when it is desired to drop input optical beam 820a, blazed grating 10 is displaced to position 14". Blazed grating 10 also receives added optical beam 820b at incident angle PHI to the original position 14'. In this particular example, blazed grating 10 operates in the Littrow condition such that the angle of incidence PHI of added signal 820b equals the angle of diffraction of output rays 30 and 32. As a result, diffracted portions of added optical beam 820b are communicated back toward circulator 818, which directs those portions of added optical beam 820b to an output 816.

Although FIGS. 11e–11f depict configurations where circulator 812 couples to drop port 814 and circulator 818 couples to output port 816, the invention also contemplates coupling circulator 812 to output port 816 and coupling circulator 818 to drop port 814. In a manner analogous to that described above, input signal 820a and added signal 820b can each be applied along the path of circulator 812 or circulator 818, depending on the particular device characteristics desired.

FIGS. 11g and 11h are block diagrams showing still another embodiment of an optical add/drop multiplexer 850 implementing blazed grating technology. In this example, add/drop multiplexer 850 includes two blazed grating elements 810a and 810b, each communicating with one of circulators 812 and 818. Circulator 812 receives input signal 820a and is coupled to a drop port 814, while circulator 818 receives added signal 820b and is coupled to output port 816.

FIG. 11g shows add/drop multiplexer 850 in a diffraction mode, which in this case corresponds to a pass through mode of operation. In this mode of operation, circulator 812 passes input signal 820a to blazed grating 810a residing at position 14". A majority of input signal 820a is diffracted toward blazed grating 810b, which also resides at position 14" and operates to diffract a majority of the signal received toward circulator 818. Circulator 818 communicates the diffracted portions of the input signal 820a to output port 816.

FIG. 11h depicts add/drop multiplexer 850 in a reflection mode, which in this case corresponds to an add/drop mode of operation. In this mode of operation, circulator 812 passes input signal 820a to blazed grating 810a residing at position 14', which reflects input signal 820a back to circulator 812 and on to drop port 814. Circulator 818 passes added signal 820b to blazed grating 810b residing at position 14'. Blazed grating 810b reflects added signal 820b back to circulator 818, which directs added signal 820 toward output port 816.

Again, the location of inputs for input signal 820a and added signal 820b could be reversed without departing from the scope of the invention. In addition the connections of circulators 812 and 818 to output port 816 and drop port 814 could be reversed without departing from the scope of the invention. The application of input signals and added signals to particular input ports and the designation of particular ports as either drop ports or output ports merely affects the modes of operation when blazed gratings 10 reside in reflection or diffraction modes.

Figure 12:
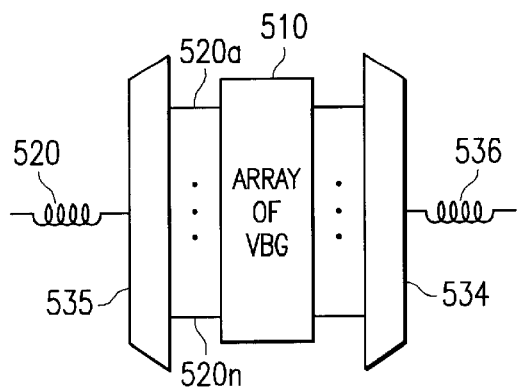
FIG. 12 is a block diagram showing one example of a novel system for facilitating multiple-wavelength signal processing according to the present invention.

Another aspect of the invention involves constructing an array of variable blazed grating devices and coupling those devices to a wavelength division demultiplexer to facilitate signal processing one wavelength or a subset of wavelengths using blazed grating technology. FIG. 12 is a block diagram showing an array 510 of variable blazed grating devices coupled to a wavelength division demultiplexer 535. In this example, array 510 is further coupled to a wavelength division multiplexer 534.

In operation, wavelength division demultiplexer 535 receives an optical input signal 520 carrying a plurality of wavelength signals 520a–520n. In this disclosure, the term "wavelength signal" is used to denote a signal that is part of another signal carrying additional wavelengths beyond those carried in the "wavelength signal." The term "wavelength signal" does not preclude that signal from itself carrying more than one wavelength of light. In other words, each "wavelength signal" can carry one or a number of wavelengths of light. Input signal 520 carries a plurality of wavelength signals 520a–520n, which may each carry one or more wavelengths of light.

Wavelength division demultiplexer 535 separates the wavelength signals 520a–520n and communicates at least some of those signals to array 510 for processing. Wavelength signals 520a–520n communicated to array 510 can undergo various signal processing, such as variable attenuation, optical switching, and/or add/drop it multiplexing to name a few examples. Array 510 then communicates processed signals 520a–520n to an output. In this example, array 510 communicates those signals to wavelength division multiplexer 534 for combination into a multiple-wavelength output signal.

Figure 14A:
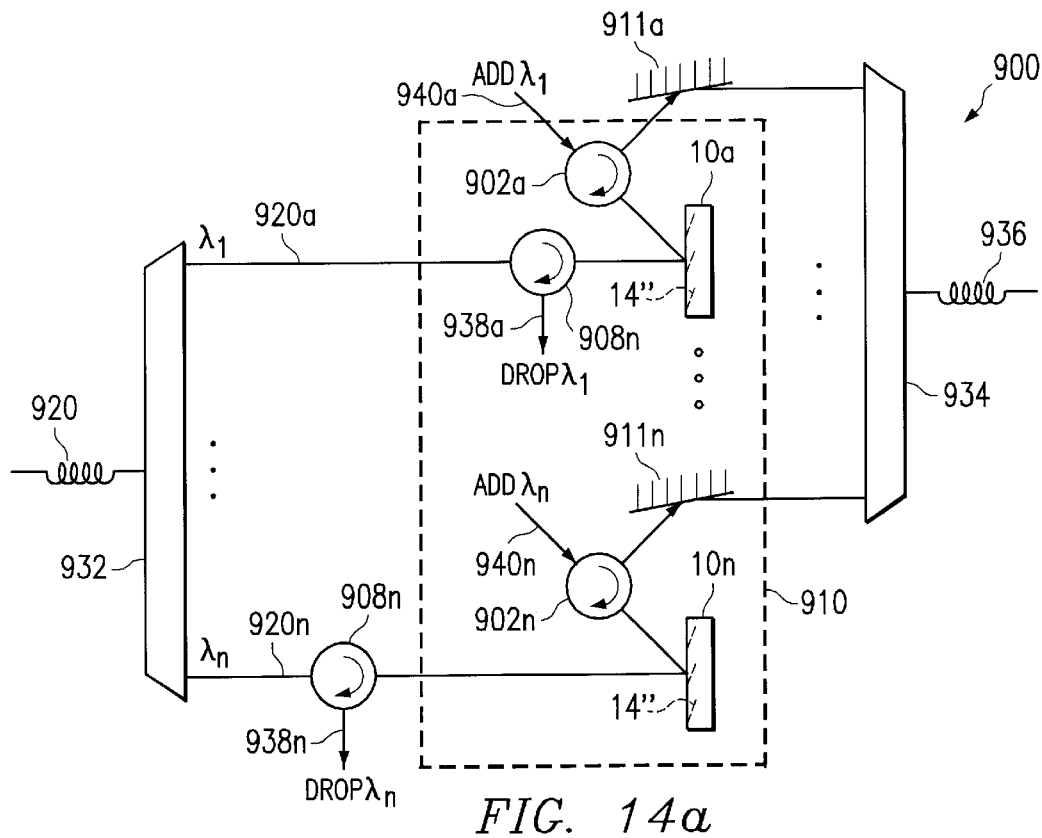
FIGS. 14a and 14b are block diagrams illustrating example embodiments of blazed grating based wavelength division optical add/drop multiplexer constructed according to the teachings of the present invention.
Figure 14B:
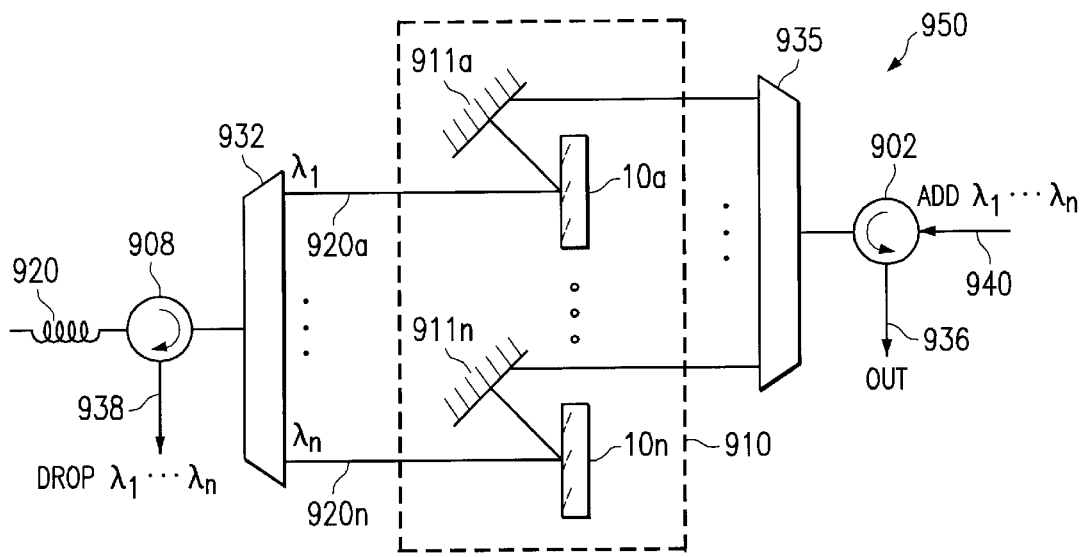
Figure 15:
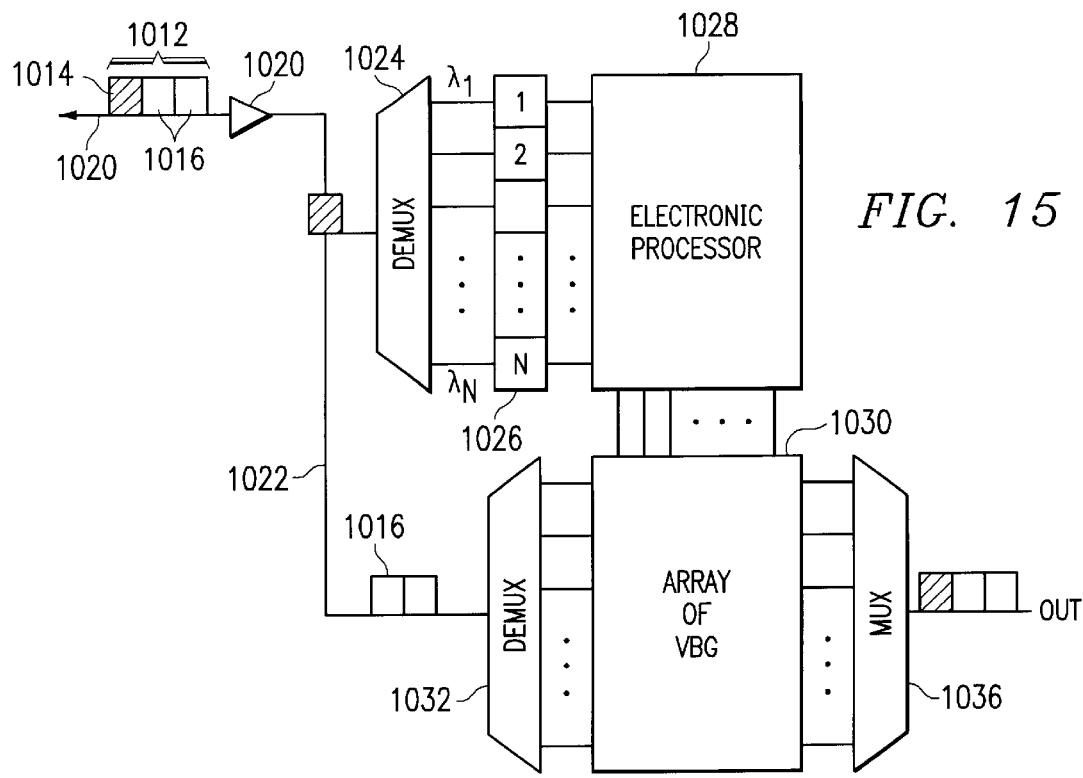
FIG. 15 is a block diagram of an exemplary blazed grating based electro-optic router constructed according to the teachings of the present invention.

FIGS. 13–15 are block diagrams showing examples of particular systems implementing arrays of variable blazed grating devices coupled to wavelength division demultiplexers.

Figure 13A:
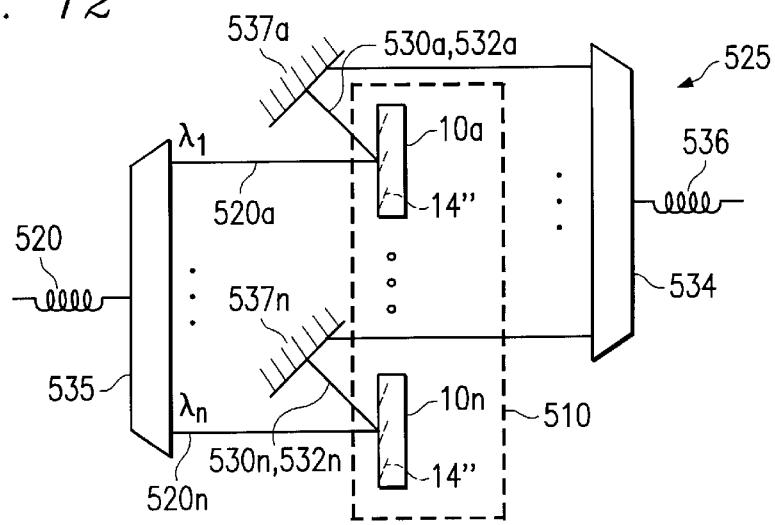
FIGS. 13a–13b are block diagrams illustrating examples of various embodiments of a blazed grating based optical gain equalizer constructed according to the teachings of the present invention.
Figure 13B:
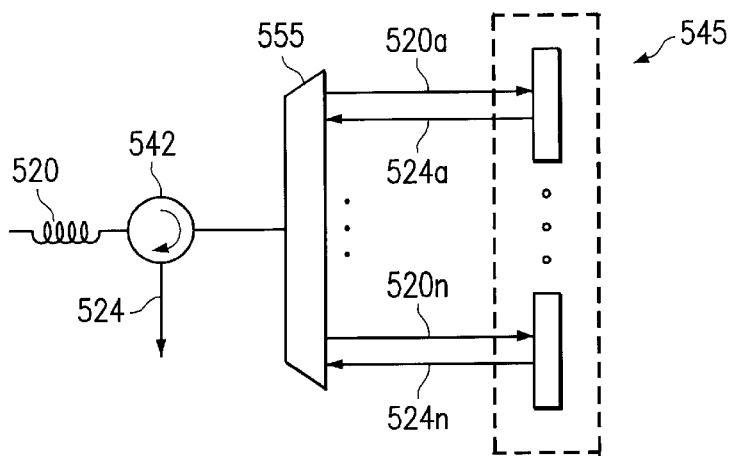

FIGS. 13a and 13b are block diagrams showing examples of optical gain equalizers 525 and 545 using variable blazed grating technology.

FIG. 13a is a block diagram illustrating an example of one possible embodiment of an optical gain equalizer 525. In this example, optical gain equalizer 525 includes a wavelength division demultiplexer 535 operable to receive an optical signal 520 carrying a plurality of individual wavelength signals 520a–520n. Wavelength division demultiplexer 535 separates optical signal 520 into its a plurality of wavelength signals 520a–520n, each signal carrying one more wavelengths of light.

Optical gain equalizer 525 includes an array 510 of blazed grating devices 10a–10n. In this example, each blazed grating device 10 operates to produce an output comprising a combination of diffracted output rays 530 and 532. Each blazed grating 10 can provide a selected level of attenuation to the wavelength signal 520a–n it receives, depending on control signals received by the device. As a particular example, each blazed grating device 10 may comprise a plurality of rotatable strips, and may operate to receive a control voltage that creates a voltage differential between some or all of the rotatable strips and an inner conductive layer. This voltage differential can be selected to cause a rotation of the strips by an angle THETA, to create a desired phase difference between diffracted output rays 530 and 532, and a corresponding attenuation of the output beam comprising a combination of diffracted rays 530 and 532. Other blazed grating devices could be used without departing from the scope of the invention.

In this embodiment, optical gain equalizer 525 further includes a wavelength division demultiplexer 534 operable to receive signals processed by blazed grating devices 10 and to multiplex individual wavelength signals into an optical output signal 536 carrying multiple wavelength signals. In this particular embodiment, reflective surfaces 537a–537n assist in communicating processed signals from blazed grating devices 10 to wavelength division multiplexer 534. Depending on the desired configuration of blazed grating array 10 relative to wavelength division demultiplexer 532 and wavelength division multiplexer 534, various combinations of reflective surfaces and other optical communication devices may be implemented without departing from the scope of the invention.

Although the illustrated embodiment describes processing each wavelength signal 520a–520n, a bypass path could alternatively be provided between demultiplexer 523 and multiplexer 534 to facilitate bypassing blazed grating array 510 for those signals not intended to be processed.

FIG. 13b provides another example of an optical gain equalizer 545 using an array 510 of blazed gratings 10a–10n to facilitate variable attenuation of multiple wavelength signals. Gain equalizer 545 is similar to gain equalizer 525, except gain equalizer 545 uses reflected rays 524 as output signals, rather than a diffracted rays 530, 532 as in gain equalizer 525.

Gain equalizer 545 includes a wavelength division multiplexer/demultiplexer 555, which operates to receive a multiple wavelength signal 520 and to separate optical signal 520 into multiple wavelength signals 520a–520n, each carrying one or more wavelengths of light. Each wavelength signal 520a–520n is communicated toward one of blazed gratings 10a–10n. Blazed gratings 10a–10n can be controlled through application of control signals to vary the diffraction efficiency of the blazed grating and, therefore, control the intensity of the reflected output rays 524.

Wavelength division multiplexer/demultiplexer 555 receives reflected rays 524a–524n, and multiplexes those wavelength signals into a multiple wavelength output signal 524. In this embodiment, a circulator 542 receives output signal 524, and directs that signal away from the path of input signal 520.

Constructing an optical gain equalizer using an array of blazed grating elements provides significant advantages in facilitating large-scale replication of each attenuation stage. For example, numerous blazed grating stages can be simultaneously formed on a single semiconductor substrate to form an array of blazed grating devices operable to serve any number of individual wavelength signals. One aspect of the invention, therefore, facilitates construction of gain equalizers capable of processing numerous wavelengths for a small incremental cost over a single stage of attenuators. This aspect of the invention provides significant cost savings in processing signals carrying information on multiple channels or wavelengths.

The novel configuration shown in FIG. 12 can also apply to an optical add/drop multiplexer design. FIG. 14a is a block diagram illustrating one example embodiment of a wavelength division optical add/drop multiplexer 900. In this example, wavelength division optical add/drop multiplexer 900 includes a wavelength division demultiplexer 932 operable to receive an optical signal 920 carrying a plurality of individual wavelength signals 920a–920n. Each individual wavelength signal 920a–920n carries one or more wavelengths of information. Wavelength division demultiplexer 932 communicates individual wavelength signals to an array 910 of optical add/drop multiplexers.

In this example, each add/drop multiplexer of array 910 is similar in structure and function to optical add/drop multiplexer 805 shown and described with respect to FIGS. 12c and 12d. Other configurations of optical add/drop multiplexers using blazed grating technology could alternatively be implemented without departing from the scope of the invention. Wavelength division optical add/drop multiplexer also includes a wavelength division multiplexer 934 operable to receive processed signals from array 910 of optical add/drop multiplexers and to multiplex those individual wavelength signals into an optical output signal 936 carrying a plurality of individual wavelength signals. In operation, wavelength division demultiplexer 932 receives optical signal 920 and separates the individual wavelength signals 920a–920n. Again, each wavelength signal 920a–920n may include one or more wavelengths of light. In a particular embodiment, wavelength signals not intended to be processed may bypass array 910 of add/drop multiplexers for recombination at multiplexer 934 without further processing.

Each of the wavelengths to be processed by array 910 is communicated to an optical add/drop multiplexer implementing a blazed grating 10. Optical add/drop multiplexers operate to either pass through the wavelength signals 920a–920n or to drop those signals at ports 938 in favor of added wavelength signals 940. Wavelength division multiplexer 934 receives processed signals from array 910 and any signals that bypassed array 910 and combines those signals into optical signal 936 carrying a plurality of wavelength signals.

FIG. 14b is a block diagram illustrating another example of a wave-division optical add/drop multiplexer 950. Wave-division add/drop multiplexer 950 is similar in operation to wave-division add/drop multiplexer 900 shown in FIG. 13a, except add/drop multiplexer 950 is configured to use common circulators 902 and 908 to be shared among multiple wavelength signals.

Like add/drop multiplexer 900, add drop multiplexer 950 includes a wavelength division demultiplexer 932 operable to receive a multiple wavelength input signal 920 and to separate that signal into a plurality of wavelength signals 920a–920n, each carrying one or more wavelengths of light.

Add/drop multiplexer 950 also includes a wave-division multiplexer/demultiplexer 935 operable to receive an added signal 940 containing a plurality of added wavelength signals 940a–940n, and to separate the constituent added wavelength signals 940a–940n.

Add/drop multiplexer 950 further includes an array 910 of blazed gratings 10a–10n. Each blazed grating 10 is operable to receive one of the wavelength signals 920a–920n from demultiplexer 932 and an added signal 940a–940n from wavelength division multiplexer/demultiplexer 935. Depending on the position of each of blazed gratings 10, either the input wavelengths 920 or the added signals 940 received can selectively be communicated toward multiplexer/demultiplexer 935 for communication to a circulator 902 and on to output port 936. Where variable blazed grating 10 operates to reflect or diffract signals back in the direction of any input signal to the system, circulators could be used to redirect the reflected or diffracted signals to enhance system performance. This embodiment provides an advantage of reducing the number of circulators by sharing circulators among a plurality of wavelengths. A similar embodiment could be constructed using multiple arrays of blazed gratings arranged similarly to add/drop multiplexer 850 shown in FIGS. 11g–11h.

As in the case of the blazed grating based gain equalizer, the blazed grating based wavelength division optical add/drop multiplexer provides significant economies over other approaches. For example, by facilitating fabrication of arrays of blazed grating elements at a fraction of the cost of fabricating a single device, this aspect of the invention provides significant cost savings in processing signals carrying information on multiple channels or wavelengths.

The novel configuration shown in FIG. 12 can also apply to an electro-optic switching system. FIG. 15 is a block diagram of an exemplary electro-optic switch 1000. Electro-optic router 1000 may include one or more optical amplifiers 1010. In the illustrated embodiment, an optical amplifier 1010 resides at the ingress end of the switch, which receives optical signals 1012 over a communication link 1020. Electro-optic switch 1000 could also or alternatively include optical amplifiers at the egress end of the switch, or at various other points within the switch. Optical amplifiers 1010 compensate for losses in the signal and line rates of, for example, OC-48 and OC-192 or higher. In the illustrated embodiment, communication link 1020 comprises a single mode fiber carrying, for example, 100 wavelengths ranging from 1500 to 1600 nanometer and 2.5 Gb/s or 10 Gb/s per channel.

Optical signal 1012 comprises header information 1014 and signal payload 1016. Electro-optic switch includes a fiber optic tap operable to communicate a first portion of optical signal 1012 to a delay line 1022 and a second portion of optical signal 1012 to a demultiplexer 1024. In the illustrated embodiment, demultiplexer 1024 may comprise, for example, a wavelength grating router, operable to split the incoming signal into a plurality of wavelengths and send the plurality of wavelengths to an array of wavelength detectors 1026.

Electro-optic switch 1000 also includes an electronic processor 1028 operable to receive optical signals from detectors 1026, to convert the optical signals to electronic signals, and perform various switching, routing, or other processing functions on the converted electronic signals. Electronic processor 1028 is further operable to convert processed electronic signals into optical signals for transmission to an optical add/drop multiplexer array 1030.

Electro-optic switch 1000 further includes a demultiplexer coupled to delay line 1022. In this embodiment, demultiplexer 1032 comprises one or more wavelength grating routers. Both demultiplexer 1032 and electronic processor 1028 communicate with an optical add/drop multiplexer array 1030. In this example, optical add/drop multiplexer array 1030 comprises an array of blazed grating based add/drop multiplexers, such as those described with respect to FIGS. 12a–12h.

Each optical add/drop multiplexer of array 1030 receives processed optical header information from electronic processor 1028 and optical payload information from delay line 1022, and performs various switching functions on those signals. A multiplexer 1036 receives switched optical signals from optical add/drop multiplexer array 1030 and transmits switched optical signals 1040 to other network elements.

In operation, electro-optical switch 1000 receives a plurality of optical signals 1012 and depending on, for example, the signal and line rates, may amplify those signals at optical amplifier 1010. Fiber optic tap 1018 receives optical signals 1012 and sends one copy of the signal including at least header information 1014 to demultiplexer 1024, and sends another copy of the signal including at least payload information 1016 to delay line 1022.

Delay line 1022 serves as a first-in-first-out (FIFO) buffer. The FIFO buffer length is set so as to provide enough time for electronic processor 1028 to process the various header information 1014. While payload information 1016 is delayed in FIFO buffer 1022, electronic processor 1028 converts optical header information 1014 into electronic signals, and performs various processing on that header information. After completing processing of the electronic header information, electronic processor 1028 converts the electronic header information back into one or more optical signals and transmits those signals to optical add/drop multiplexer array 1030.

Optical add/drop multiplexer array 1030 receives processed header information and unprocessed payload information 1016, and associates the related payload and header information. Optical add/drop multiplexer array 1030 then switches the processed optical signals at rates ranging, for example, from approximately 10 to 100 nanoseconds or longer. Multiplexer 1036 receives switched optical signals 1040 from optical add/drop multiplexer array 1030 and transmits the switched optical signals to other network elements.

By transmitting the optical payload information transparently to electronic processor 1028, electro-optical switch 1000 advantageously facilitates field coding. As such, header information can be electronically processed at rates on the order of 2.5 Gigabytes per second, while transparent optical payload information communicates at rates of 10 Gigabytes per second or higher. Electro-optic switch 1000 also facilitates parallel processing of multiple wavelength channels, increasing the speed and efficiency of the switch. In a particular embodiment, differential logic such as Manchester coding can be used to compensate for switching contrast ratio.

Figure 16:
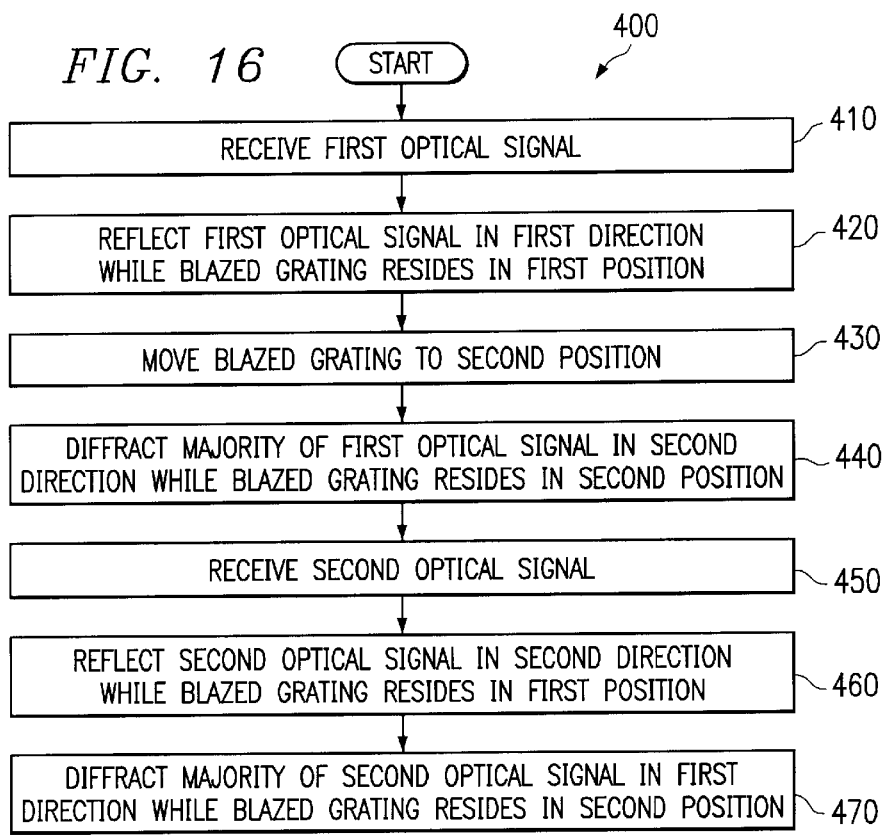
FIG. 16 is a flow chart illustrating one example of a method of optical signal processing using a blazed grating based apparatus according to the teachings of the present invention.

FIG. 16 is a flow chart illustrating one example of a method 400 of optical signal processing using a variable blazed grating based apparatus. Although specific examples of this method use blazed grating 100 as a particular illustrative embodiment, the method could also be applied to other blazed grating devices, such as those depicted in FIGS. 2–7, as well as systems such as those shown in FIGS. 8–15, and variations of those devices and systems.

In this example, the method 400 begins at step 410 where blazed grating device 10 receives a first optical signal while residing at a first position 14'. In one particular example, blazed grating 10 could comprise a plurality of at least partially reflective adjacent mirror strips 14. To enhance system speed and flexibility, in one embodiment, each of the strips could be constructed to have a width of no more than 40 microns. While residing at position 14', mirror strips 14 comprising this example of variable blazed grating 10 may reside approximately parallel to an inner conductive layer. In another mode of operation, blazed grating 10 can reside at a second position 141", rotated by an angle THETA from the first position 14'.

While blazed grating 10 resides in the first position 14', it operates to reflect the first optical signal in a first direction at step 420. Where first optical signal comprises a normal incident signal, blazed grating 10 operates to reflect signal 20 back in the direction from which it came. Where first optical signal comprises a non-normal incident signal, blazed grating 10 may operate to reflect signal 20 at an angle equal to 180 degrees minus the angle of incidence between signal 20 and strips 14 at position 14'.

At any desired time, blazed grating 10 can be displaced to second position 141" at step 430. As discussed above, while in second position 14", blazed grating 10 resides at an angle THETA from position 14'. While blazed grating 10 resides in second position 14", it diffracts a majority of the first optical signal 20 in a second direction at step 440. Where first optical signal 20 comprises a normal incident signal, blazed grating 10 may diffract a majority of signal 20 at an output angle as shown by output rays 30 and 32 in FIG. 1b. Where input signal 20 comprises a non-normal incident signal, blazed grating 10 at position 141" may operate to diffract signal portions 30 and 32 as shown, for example, in FIG. 1c. FIG. 1c illustrates the Littrow condition, wherein the angle of diffraction equals the angle of incidence of optical signal 20 to blazed grating 10 at position 14". In any case, output rays 30 and 32 exhibit a phase difference that results in a constructive or a destructive interference between those diffracted signal portions.

Where variable blazed grating 10 operates to reflect or diffract signals back in the direction of any input signal to the system, circulators could be used to redirect the reflected or diffracted signals to enhance system performance.

In one aspect of operation, blazed grating device 10 can operate as a variable attenuator by controlling angle THETA to result in a particular phase difference between portions of the majority of the diffracted beam. In another aspect of operation, blazed grating device 10 can operate as an optical switch. In that case, it may be desirable to create a phase difference between diffracted output rays 30 and 32 resulting in a constructive interference between those beam portions to maximize the output signal.

Method 400 applies not only to variable attenuators and 1×2 optical switches, but also to n×n optical switches and optical add/drop multiplexers. For example, method 400 may continue at step 450 where blazed grating device 10 receives a second optical signal. While blazed grating 10 resides in first position 14', it may reflect a second optical signal in a second direction at step 460. For example, as shown in FIGS. 12a–12b, blazed grating 10 residing at position 14' may reflect first input signal 20a back to circulator 702 and reflect second input signal 20b to second circulator 708. In the case of an optical ad/drop multiplexer, for example, FIGS. 12a, 12c, and 12e show that input signals and added signals 820a and 820b are reflected by blazed grating 10 at position 14' to circulators 802 and 808 to result in pass-through or add/drop operation, depending on the configuration of the input signals relative to circulators 802 and 808.

While blazed grating 10 is displaced to position 14", blazed grating 10 diffracts a majority of the second optical signal in the first direction at step 470. In the case of an optical switch, as shown in FIGS. 12a–12b, when blazed grating 10 is displaced to position 14", it diffracts a majority of first input signal 20a toward second circulator 708, while diffracting a majority of second input signal 20b toward first circulator 702. In the case of an add/drop multiplexer, as shown, for example, in FIGS. 12b, 12d, and 12f, input and added signals 820a and 820b (which may vary depending on the configuration) can be selectively added or passed through by diffracting the majority of the signals toward circulators 802 and 808.

Although this method has been described by referencing particular examples of variable attenuators, optical switches, and optical add/drop multiplexers, various substitutions, alterations and modifications can be made to the configurations described herein without departing from the scope of the invention.

Although various aspects of the present invention have been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical switching element comprising:
   a variable blazed grating operable to receive and reflect one or more input signals while the grating remains in a first position and to receive and reflect one or more input signals while the grating remains in a second position, the variable blazed grating comprising:
      an inner conductive layer; and
      a plurality of approximately adjacent at least partially reflective mirror strips disposed outwardly from the inner conductive layer, each strip operable to receive a portion of an input optical signal, wherein each of the plurality of strips is operable to undergo a partial rotation resulting in a reflection of a majority of the input signal toward an output; and
   a first circulator operable to receive from the variable blazed grating a first output signal traveling approximately along the path of an input signal to the grating but in an approximately opposite direction to that input signal, the circulator further operable to redirect the first output signal from the path of the input signal.

2. The optical switching element of claim 1, wherein the first output signal comprises a reflected version of an input signal received by the grating at a normal incident angle to the grating in the first position.

3. The optical switching element of claim 1, wherein the first output signal comprises a reflected version of an input signal received by the grating at a non-normal incident angle to the grating in the first position.

4. The optical switching element of claim 1, wherein the first output signal comprises a majority of reflected portions of an input signal received by the grating at a normal incident angle to the grating in the second position.

5. The optical switching element of claim 1, wherein the first output signal comprises a majority of reflected portions of an input signal received by the grating at a non-normal incident angle to the grating in the second position.

6. The optical switching element of claim 1, further comprising a second circulator operable receive from the variable blazed grating a second output signal traveling approximately along the path of an input signal to the variable blazed grating but in an approximately opposite direction to that input signal, the circulator further operable to redirect the second output signal from the path of the input signal.

7. The optical switching element of claim 6, wherein the first output signal comprises a reflected version of a first input signal received by the grating at a normal incident angle to the grating in the first position, and wherein the second output signal comprises a reflected version of a second input signal received by the grating at a non-normal incident angle to the grating in the first position.

8. The optical switching element of claim 6, wherein the first output signal comprises a reflected version of a first input signal received by the grating at a non-normal incident angle to the grating in the first position, and wherein the second output signal comprises a reflected version of a second input signal received by the grating at a non-normal incident angle to the grating in the first position.

9. The optical switching element of claim 6, wherein the first output signal comprises a majority of reflected portions of a first input signal received by the grating at a non-normal incident angle to the grating in the second position, and wherein the second output signal comprises a majority of reflected portions of a second input signal received by the grating at a non-normal incident angle to the grating in the second position.

10. The optical switching element of claim 1, wherein none of the strips has a width greater than 40 microns.

11. The optical switching element of claim 1, wherein the strips are operable to undergo a maximum rotation that is greater than 2 degrees.

12. The optical switching element of claim 1, wherein the circulator is operable to redirect the first output signal received from the variable blazed grating and to incur less than a three decibel loss in the redirected signal as compared to the output signal received by the circulator from the variable blazed grating.

13. The optical switching element of claim 1, wherein the circulator is operable to redirect the first output signal received from the variable blazed grating to prevent the first output signal from interfering with the input signal.

14. An optical switching element, comprising:
   a variable blazed grating operable to receive a first optical input signal from a first input and to reflect the first signal toward a first output while the grating remains in a first position, the variable blazed grating further operable to undergo a displacement to a second position, the displacement resulting in a reflection of a majority of the first input signal toward a second output;
   wherein the optical switching element is operable to switch between the first position and the second position and at a rate optimized for a packet size having at least a specified number of bytes being transmitted at a particular data rate.

15. The optical switching element of claim 14, wherein the rate is faster than once every microsecond.

16. The optical switching element of claim 14, wherein the rate is faster than once every 10 microseconds.

17. The optical switching element of claim 14, wherein the rate is faster than once every 30 microseconds.

18. The optical switching element of claim 14, wherein the packet size comprises an average packet size of packets encountered by the switching element.

19. The optical switching element of claim 14, wherein the packet size comprises between 40 and 60 bytes and wherein the rate comprises between once each 300 nanoseconds and once each 100 nanoseconds.

20. A method of processing optical signals using a variable blazed grafting the method comprising:
   receiving at a variable blazed grating residing in a first position one or more optical input signals, the variable blazed grating comprising:
      an inner conductive layer, and
      a plurality of approximately adjacent at least partially reflective mirror strips disposed outwardly from the inner conductive layer, each strip operable to receive a portion of an input optical signal, wherein each of the plurality of strips is operable to undergo a partial rotation, the partial rotation resulting in a reflection of a majority of the input signal toward an output;
   displacing the grating between a first position and a second position;
   reflecting the input signals while the blazed grating remains at the first position;
   for each input signal received, reflecting a majority of that input signal in a particular direction while the grating remains at the second position; and
   receiving from the grating a first output signal at a first circulator disposed in the path of an input signal, the first circulator operable to redirect the first output signal from the path of the input signal.

21. The method of claim 20, wherein the first output signal comprises a reflected version of an input signal received by the grating at a normal incident angle to the grating in the first position.

22. The method of claim 20, wherein the first output signal comprises a reflected version of an input signal received by the grating at a non-normal incident angle to the grating in the first position.

23. The method of claim 20, wherein the first output signal comprises a majority of reflected portions of an input signal received by the grating at a normal incident angle to the grating in the second position.

24. The method of claim 20, wherein the first output signal comprises a majority of reflected portions of an input signal received by the grating at a non-normal incident angle to the grating in the second position.

25. The method of claim 20, further comprising receiving from the grating a second output signal at a second circulator disposed in the path of an input signal, the second circulator operable to redirect the second output signal from the path of the input signal.

26. The method of claim 25, wherein the first output signal comprises a reflected version of a first input signal received by the grating at a normal incident angle to the grating in the first position, and wherein the second output signal comprises a reflected version of a second input signal received by the grating at a non-normal incident angle to the grating in the first position.

27. The method of claim 25, wherein the first output signal comprises a reflected version of a first input signal received by the grating at a non-normal incident angle to the grating in the first position, and wherein the second output signal comprises a reflected version of a second input signal received by the grating at a non-normal incident angle to the grating in the first position.

28. The method of claim 25, wherein the first output signal comprises a majority of reflected portions of a first input signal received by the grating at a non-normal incident angle to the grating in the second position, and wherein the second output signal comprises a majority of reflected portions of a second input signal received by the grating at a non-normal incident angle to the grating in the second position.

29. The method of claim 20, wherein none of the strips has a width greater than 40 microns.

30. The method of claim 20, wherein the strips are operable to undergo a maximum rotation that is greater than 2 degrees.

31. The method of claim 20, wherein the circulator is operable to redirect the first output signal received from the variable blazed grating and to incur less than a three decibel loss in the redirected signal as compared to the output signal received by the circulator from the variable blazed grating.

32. The method of claim 20, wherein the circulator is operable to redirect the first output signal received from the variable blazed grating to prevent the output signal interfering with the input signal.

33. An optical switching element comprising:
   a variable blazed grating operable to receive and reflect one or more input signals while the grating remains in a first position and to receive and reflect one or more input signals while the grating remains in a second position;
   a first circulator operable to receive from the variable blazed grating a first output signal traveling approximately along the path of an input signal to the grating but in an approximately opposite direction to that input signal, the circulator further operable to redirect the first output signal from the path of the input signal; and
   a second circulator operable receive from the variable blazed grating a second output signal traveling approximately along the path of an input signal to the variable blazed grating but in an approximately opposite direction to that input signal, the circulator further operable to redirect the second output signal from the path of the input signal.

34. The optical switching element of claim 33, wherein the first output signal comprises a reflected version of a first input signal received by the grating at a normal incident angle to the grating in the first position, and wherein the second output signal comprises a reflected version of a second input signal received by the grating at a non-normal incident angle to the grating in the first position.

35. The optical switching element of claim 33, wherein the first output signal comprises a reflected version of a first input signal received by the grating at a non-normal incident angle to the grating in the first position, and wherein the second output signal comprises a reflected version of a second input signal received by the grating at a non-normal incident angle to the grating in the first position.

36. The optical switching element of claim 33, wherein the first output signal comprises a majority of reflected portions of a first input signal received by the grating at a non-normal incident angle to the grating in the second position, and wherein the second output signal comprises a majority of reflected portions of a second input signal received by the grating at a non-normal incident angle to the grating in the second position.

37. The optical switching element of claim 33, wherein the first circulator is operable to redirect the first output signal received from the variable blazed grating and to incur less than a three decibel loss in the redirected signal as compared to the output signal received by the circulator from the variable blazed grating.

38. A method of processing optical signals using a variable blazed grating, the method comprising:

receiving at a variable blazed grating residing in a first position one or more optical input signals;

displacing the grating between a first position and a second position;

reflecting the input signals while the blazed grating remains at the first position;

for each input signal received, reflecting a majority of that input signal in a particular direction while the grating remains at the second position;

receiving from the grating a first output signal at a first circulator disposed in the path of an input signal, the first circulator operable to redirect the first output signal from the path of the input signal;

receiving from the grating a second output signal at a second circulator disposed in the path of an input signal, the second circulator operable to redirect the second output signal from the path of the input signal.

39. The method of claim 38, wherein the first output signal comprises a reflected version of a first input signal received by the grating at a normal incident angle to the grating in the first position, and wherein the second output signal comprises a reflected version of a second input signal received by the grating at a non-normal incident angle to the grating in the first position.

40. The method of claim 38, wherein the first output signal comprises a reflected version of a first input signal received by the grating at a non-normal incident angle to the grating in the first position, and wherein the second output signal comprises a reflected version of a second input signal received by the grating at a non-normal incident angle to the grating in the first position.

41. The method of claim 38, wherein the first output signal comprises a majority of reflected portions of a first input signal received by the grating at a non-normal incident angle to the grating in the second position, and wherein the second output signal comprises a majority of reflected portions of a second input signal received by the grating at a non-normal incident angle to the grating in the second position.

42. The method of claim 38, wherein the first circulator is operable to redirect the first output signal received from the variable blared grating and to incur less than a three decibel loss in the redirected signal as compared to the output signal received by the circulator from the variable blazed grating.

43. An optical switching element comprising:

a variable blazed grating operable to receive and reflect one or more input signals while the grating remains in a first position and to receive and diffract one or more input signals while the grating remains in a second position, the variable blazed grating comprising:

an inner conductive layer; and a plurality of approximately adjacent at least partially reflective mirror strips disposed outwardly from the inner conductive layer, each strip operable to receive a portion of an input optical signal wherein each of the plurality of strips is operable to undergo a partial rotation resulting in a reflection of a majority of the input signal toward an output; and a first circulator operable to receive from the variable blazed grating a first output signal traveling approximately along the path of an input signal to the grating but in an approximately opposite direction to that input signal, the circulator further operable to redirect the first output signal from the path of the input signal.

44. The optical switching element of claim 43, wherein the first output signal comprises a reflected version of an input signal received by the grating at a normal incident angle to the grating in the first position.

45. The optical switching element of claim 43, wherein the first output signal comprises a reflected version of an input signal received by the grating at a non-normal incident angle to the grating in the first position.

46. The optical switching element of claim 43, wherein the first output signal comprises a majority of diffracted portions of an input signal received by the grating at a normal incident angle to the grating in the second position.

47. The optical switching element of claim 43, wherein the first output signal comprises a majority of diffracted portions of an input signal received by the grating at a non-normal incident angle to the grating in the second position.

48. The optical switching element of claim 43, further comprising a second circulator operable receive from the variable blazed grating a second output signal traveling approximately along the path of an input signal to the variable blazed grating but in an approximately opposite direction to that input signal, the circulator fixer operable to redirect the second output signal tom tie path of the input signal.

49. The optical switching element of claim 48, wherein the first output signal comprises a majority of diffracted portions of a first input signal received by the grating at a non-normal incident angle to the grating in the second position, and wherein the second output signal comprises a majority of diffracted portions of a second input signal received by the grating at a non-normal incident angle to the grating in the second position.

50. The optical switching element of claim 43, wherein the circulator is operable to redirect the first output signal received from the variable blazed grating and to incur less than a three decibel loss in the redirected signal as compared to the output signal received by the circulator from the variable blazed grating.

51. An optical switching element, comprising:

a variable blazed grating operable to receive a first optical input signal from a first input and to reflect the first signal toward a first output while the grating remains in a first position, the variable blazed grating further operable to undergo a displacement to a second position, the displacement resulting in a diffraction of a majority of the first input signal toward a second output;

wherein the the optical switching element is operable to switch between the first position and the second position and at a rate optimized for a packet size having at least a specified number of bytes being transmitted at a particular data rate.

52. The optical switching element of claim 51, wherein the rate is faster than once every 30 microseconds.

53. The optical switching element of claim 51, wherein the packet size comprises between 40 and 60 bytes and wherein the rate comprises between once each 300 nanoseconds and once each 100 nanoseconds.

54. A method of processing optical signals using a variable blazed grating, the method comprising:

receiving at a variable blazed grating residing in a first position one or more optical input signals, the variable blazed grating comprising:

an inner conductive layer; and a plurality of approximately adjacent at least partially reflective mirror strips disposed outwardly from the inner conductive layer, each strip operable to receive a portion of an input optical signal, wherein each of the plurality of strips is operable to undergo a partial rotation, the partial rotation resulting in a reflection of a majority of the input signal toward an output;

displacing the grating between a first position and a second position;

reflecting the input signals while the blazed grating remains at the first position;

for each input signal received, diffracting a majority of that input signal in a particular direction while the grating remains at the second position; and receiving from the grating a first output signal at a first circulator disposed in the path of an input signal, the first circulator operable to redirect the first output signal from the path of the input signal.

55. The method of claim 54, wherein the first output signal comprises a reflected version of an input signal received by the grating at a normal incident angle to the grating in the first position.

56. The method of claim 54, wherein the first output signal comprises a reflected version of an input signal received by the grating at a non-normal incident angle to the grating in the first position.

57. The method of claim 54, wherein the first output signal comprises a majority of diffracted portions of an input signal received by the grating at a normal incident angle to the grating in the second position.

58. The method of claim 54, wherein the first output signal comprises a majority of diffracted portions of an input signal received by the grating at a non-normal incident angle to the grating in the second position.

59. The method of claim 54, further comprising receiving from the grating a second output signal at a second circulator disposed in the path of an input signal, the second circulator operable to redirect the second output signal from the path of the input signal.

60. The method of claim 54, wherein the circulator is operable to redirect the first output signal received from the variable blazed grating and to incur less than a three decibel loss in the redirected signal as compared to the output signal received by the circulator from the variable blazed grating.

61. An optical switching element comprising:

a variable blazed grating operable to receive and reflect one or more input signals while the grating remains in a first position and to receive and diffract one or more input signals while the grating remains in a second position;

a first circulator operable to receive from the variable blazed grating a first output signal traveling approximately along the path of an input signal to the grating but in an approximately opposite direction to that input signal, the circulator further operable to redirect the first output signal from the path of the input signal; and a second circulator operable receive from the variable blazed grating a second output signal traveling approximately along the path of an input signal to the variable blazed grating but in an approximately opposite direction to that input signal, the circulator further operable to redirect the second output signal from the path of the input signal.

62. The optical switching element of claim 61, wherein the first output signal comprises a reflected version of a first input signal received by the grating at a normal incident angle to the grating in the first position, and wherein the second output signal comprises a reflected version of a second input signal received by the grating at a non-normal incident angle to the grating in the first position.

63. The optical switching element of claim 61, wherein the first output signal comprises a reflected version of a first input signal received by the grating at a non-normal incident angle to the grating in the first position, and wherein the second output signal comprises a reflected version of a second input signal received by the grating at a non-normal incident angle to the grating in the first position.

64. The optical switching element of claim 61, wherein the first output signal comprises a majority of diffracted portions of a first input signal received by the grating at a non-normal incident angle to the grating in the second position, and wherein the second output signal comprises a majority of diffracted portions of a second input signal received by the grating at a non-normal incident angle to the grating in the second position.

65. The optical switching element of claim 61, wherein the first circulator is operable to redirect the first output signal received from the variable blazed grating and to incur less than three decibel loss in the redirected signal as compared to the output signal received by the circulator from the variable blazed grating.

* * * * *